United States Patent
Kusashima et al.

(10) Patent No.: US 10,440,747 B2
(45) Date of Patent: Oct. 8, 2019

(54) TERMINAL DEVICE, BASE STATION DEVICE, AND COMMUNICATION METHOD

(71) Applicant: SHARP KABUSHIKI KAISHA, Sakai, Osaka (JP)

(72) Inventors: Naoki Kusashima, Sakai (JP); Kazuyuki Shimezawa, Sakai (JP); Wataru Ouchi, Sakai (JP); Alvaro Ruiz Delgado, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/750,149

(22) PCT Filed: Aug. 2, 2016

(86) PCT No.: PCT/JP2016/072621
§ 371 (c)(1),
(2) Date: Feb. 2, 2018

(87) PCT Pub. No.: WO2017/022748
PCT Pub. Date: Feb. 9, 2017

(65) Prior Publication Data
US 2018/0227953 A1 Aug. 9, 2018

(30) Foreign Application Priority Data
Aug. 5, 2015 (JP) .................................. 2015-154657

(51) Int. Cl.
*H04W 74/08* (2009.01)
*H04W 72/04* (2009.01)
(Continued)

(52) U.S. Cl.
CPC ........... *H04W 74/0808* (2013.01); *H04J 1/00* (2013.01); *H04J 11/00* (2013.01); *H04W 16/14* (2013.01); *H04W 72/08* (2013.01); *H04W 72/12* (2013.01)

(58) Field of Classification Search
CPC ...... H04W 16/14; H04W 72/12; H04W 74/08
See application file for complete search history.

(56) References Cited

U.S. PATENT DOCUMENTS

2017/0085346 A1* 3/2017 Tiirola .................. H04W 28/26
2017/0111874 A1* 4/2017 Harada .................. H04L 5/001
(Continued)

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213 V12.4.0 (Dec. 2014), Valbonne—France.
(Continued)

*Primary Examiner* — Gary Lafontant
(74) *Attorney, Agent, or Firm* — ScienBiziP, P.C.

(57) ABSTRACT

To efficiently control a cell by using a non-allocated frequency band or a shared frequency band. A terminal device includes a transmission unit configured to transmit a PUSCH and a CCA check unit configured to perform LBT before a subframe for which a transmission of the PUSCH is indicated. The terminal device determines start time of the LBT, based on start time of the transmission of the PUSCH, a CCA slot length, and the number of CCA checks. The terminal device includes a reception unit configured to receive a PDCCH. The number of CCA checks is indicated on the PDCCH.

6 Claims, 15 Drawing Sheets

(51) Int. Cl.
H04J 1/00 (2006.01)
H04J 11/00 (2006.01)
H04W 16/14 (2009.01)
H04W 72/08 (2009.01)
H04W 72/12 (2009.01)

(56) References Cited

U.S. PATENT DOCUMENTS

2017/0318565 A1* 11/2017 Golitschek Edler Von
 Elbwart .............. H04W 72/042
2017/0318607 A1* 11/2017 Tiirola .............. H04W 72/0446
2017/0332395 A1* 11/2017 Yin .................. H04W 72/1263

OTHER PUBLICATIONS

3rd Generation Partnership Project; Technical Specification Group Radio Access Network; Study on Licensed-Assisted Access to Unlicensed Spectrum; (Release 13), 3GPP TR 36.889 V1.0.1 (Jun. 2015), Valbonne—France.
Uplink transmission with LBT, Intel Corporation, 3GPP TSG-RAN WG2 #89bis R2-151102, Apr. 20-24, 2015, Bratislava, Slovakia.
Motorola Mobility: "Further Discussions on Physical Layer options for LAA-LTE" 3GPP Draft; R1-153183_PHYLAYEROPTIONS_V4, 3rd Generation Partnership Project (3GPP), Mobile Competence Centre ; 650, Route Des Lucioles ; F-06921 Sophia-Antipolis Cedex ; France, vol. RAN WG1, No. Fukuoka, Japan; Apr. 25, 2015-May 29, 2015, May 24, 2015.

* cited by examiner

TERMINAL DEVICE, BASE STATION DEVICE, AND COMMUNICATION METHOD

TECHNICAL FIELD

Embodiments of the present invention relate to a technique of a terminal device, a base station device, and a communication method that enable efficient communication.

BACKGROUND ART

The 3rd Generation Partnership Project (3GPP), which is a standardization project, standardized the Evolved Universal Terrestrial Radio Access (hereinafter, referred to as E-UTRA), in which high-speed communication is realized by adopting an Orthogonal Frequency-Division Multiplexing (OFDM) communication scheme and flexible scheduling using a unit of prescribed frequency and time called resource block.

Moreover, the 3GPP discusses Advanced E-UTRA, which realizes higher-speed data transmission and has upper compatibility with E-UTRA. E-UTRA relates to a communication system based on a network in which base station devices have substantially the same cell configuration (cell size); however, regarding Advanced E-UTRA, discussion is made on a communication system based on a network (different-type radio network, Heterogeneous Network) in which base station devices (cells) having different configurations coexist in the same area. In this regard, E-UTRA is also referred to as "LTE (Long Term Evolution)", and Advanced E-UTRA is also referred to as "LTE-Advanced". Furthermore, LTE may be a collective name including LTE-Advanced.

A Carrier Aggregation (CA) technique and a Dual Connectivity (DC) technique are specified, in which, in a communication system where cells (macro cells) having large cell radii and cells (small cells) having smaller cell radii than those of the macro cells coexist as in a heterogeneous network, a terminal device performs communication by connecting to a macro cell and a small cell simultaneously (NPL 1).

Meanwhile, NPL 2 studies Licensed-Assisted Access (LAA). According to LAA, a non-allocated frequency band (Unlicensed spectrum) used by a wireless Local Area Network (LAN) is used as LTE. More specifically, the non-allocated frequency band is configured as a secondary cell (secondary component carrier). Connection, communication, and/or a configuration of the secondary cell(s) used as LAA are assisted by a primary cell (primary component carrier) configured to an allocated frequency band (Licensed spectrum). LAA widens a frequency band that is available for LTE, and thus wide band transmission is enabled. In this regard, LAA is used in a shared frequency band (shared spectrum) shared between prescribed operators.

CITATION LIST

Non-Patent Document

[NON-PATENT DOCUMENT 1] NPL 1: 3rd Generation Partnership Project; Technical Specification Group Radio Access Network; Evolved Universal Terrestrial Radio Access (E-UTRA); Physical layer procedures (Release 12), 3GPP TS 36.213 V12.4.0 (2014-12).

[NON-PATENT DOCUMENT 2] NPL 2: 3rd Generation Partnership Project; Technical Specification Group Radio Access Network; Study on Licensed-Assisted Access to Unlicensed Spectrum; (Release 13), 3GPP TR 36.889 V1.0.1 (2015-6).

DISCLOSURE OF THE INVENTION

Problems to be Solved by the Invention

According to LAA, in a case that the non-allocated frequency band or the shared frequency band is used, the frequency band is shared between other systems and/or other operators. However, LTE is designed assuming use in an allocated frequency band or a non-shared frequency band. Therefore, the LTE in the related art may not be used in the non-allocated frequency band or the shared frequency band.

The present invention has been made in view of the above-described respects, and an object of the present invention is to provide a terminal device, a base station device, and a communication method that allow efficient control of a cell using a non-allocated frequency band or a shared frequency band.

Means for Solving the Problems (1) In order to accomplish the above-described object, according to some aspects of the present invention, the following measures are provided. Specifically, a terminal device according to an aspect of the present invention includes: a transmission unit configured to transmit a PUSCH: and a CCA check unit configured to perform LBT before a subframe for which a transmission of the PUSCH is indicated. The terminal device determines start time of the LBT, based on start time of the transmission of the PUSCH and a CCA slot length.

(2) Moreover, a base station device according to an aspect of the present invention is a base station device for communicating with a terminal device, is a base station device for communicating with a terminal device, the base station device including: a reception unit configured to receive a PUSCH; and a transmission unit configured to transmit a PDCCH. In LBT of the terminal device, a CCA check is performed a prescribed number of times. Start time of the LBT is determined based on start time of a transmission of the PUSCH, a CCA slot length, and the number of CCA checks. The base station device indicates the number of CCA checks on the PDCCH.

(3) Moreover, a communication method according to an aspect of the present invention is a communication method used by a terminal device, the communication method including the steps of: transmitting a PUSCH; and performing LBT before a subframe for which a transmission of the PUSCH is indicated. In the communication method, start time of the LBT is determined based on start time of the transmission of the PUSCH and a CCA slot length.

(4) Moreover, a communication method according to an aspect of the present invention is a communication method used by a base station device for communicating with a terminal device, the communication method including the steps of: receiving a PUSCH; and transmitting a PDCCH. In LBT of the terminal device, a CCA check is performed a prescribed number of times. Start time of the LBT is determined based on start time of a transmission of the PUSCH, a CCA slot length, and the number of CCA checks. In the communication method, the number of CCA checks is indicated on the PDCCH.

Effects of the Invention

According to some aspects of the present invention, in a radio communication system, in which a base station device and a terminal device communicate, transmission efficiency is improved.

MODE FOR CARRYING OUT THE INVENTION

First Embodiment

A first embodiment of the present invention will be described below. A description will be given by using a communication system (cellular system) in which a base station device (base station, NodeB, or eNodeB (eNB)) and a terminal device (terminal, mobile station, a user device, or User Equipment (UE)) communicate in a cell.

A physical channel and a physical signal substantially used in EUTRA and Advanced EUTRA will be described. The "channel" refers to a medium used to transmit a signal, and the "physical channel" refers to a physical medium used to transmit a signal. In the present embodiment, the physical channel may be used synonymously with "signal." In the future EUTRA and Advanced EUTRA, the physical channel may be added or its constitution and format type may be changed or added; however, the description of the present embodiment will not be affected even if the channel is changed or added.

In EUTRA and Advanced EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling for allocating a physical channel. The "resource block" is defined by a given frequency domain constituted of a set of multiple subcarriers (e.g., 12 subcarriers) on a frequency axis and a domain constituted of a specific transmission time slot (one slot).

In the EUTRA and Advanced EUTRA, a frame structure type is defined. Frame structure type 1 is applicable to Frequency Division Duplex (FDD). Frame structure type 2 is applicable to Time Division Duplex (TDD).

Figure 1:
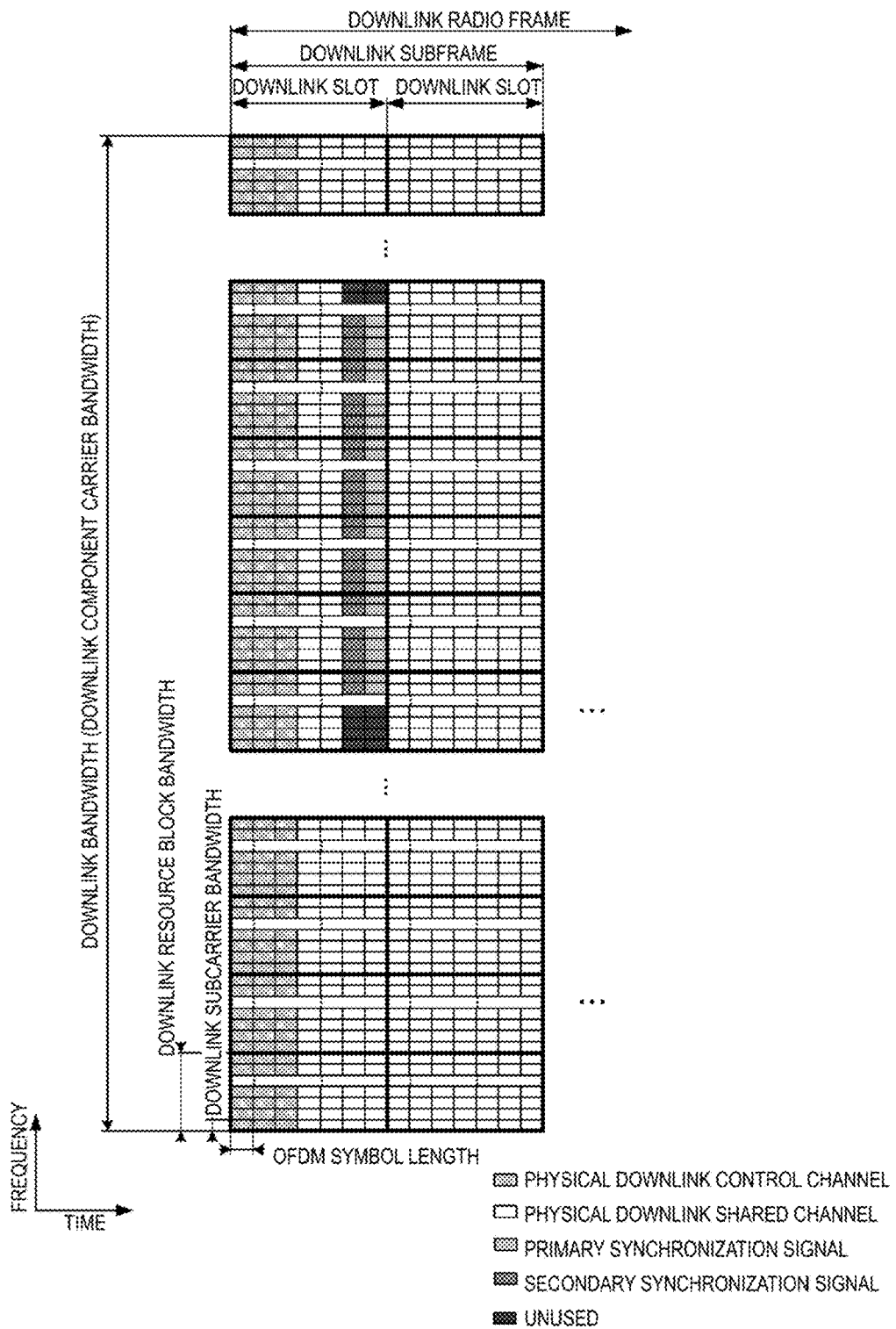
FIG. 1 is a diagram illustrating an example of a downlink radio frame configuration according to a present embodiment.

FIG. 1 is a diagram illustrating an example of a downlink radio frame configuration according to the present embodiment. In the downlink, an OFDM access scheme is used. Transmission of a downlink signal and/or on a downlink physical channel in the downlink is referred to as a downlink transmission. In the downlink, a PDCCH, an EPDCCH, a Physical Downlink Shared CHannel (PDSCH), and the like are allocated. A downlink radio frame is constituted by a downlink Resource Block (RB) pair. This downlink RB pair is a unit for allocation of a downlink radio resource and the like and is based on the frequency band of a predefined width (RB bandwidth) and a time duration (two slots=1 subframe). Each of the downlink RB pairs is constituted of two downlink RBs (RB bandwidth×slot) that are contiguous in time domain. Each of the downlink RBs is constituted of 12 subcarriers in frequency domain. In the time domain, the downlink RB is constituted of seven OFDM symbols in a case that a normal Cyclic Prefix (CP) is added, while the downlink RB is constituted of six OFDM symbols in a case that a cyclic prefix that is longer than the normal cyclic prefix is added. A region defined by a single subcarrier in the frequency domain and a single OFDM symbol in the time domain is referred to as "Resource Element (RE)". A physical downlink control channel is a physical channel on which downlink control information such as a terminal device identifier, physical downlink shared channel scheduling information, physical uplink shared channel scheduling information, and a modulation scheme, coding rate, and retransmission parameter are transmitted. Note that although a downlink subframe in a single Component Carrier (CC) is described here, a downlink subframe is defined for each CC and downlink subframes are approximately synchronized between the CCs.

In the downlink, synchronization signals are assigned. The synchronization signals are used to adjust timings for downlink signals and/or channels mainly between a base station device transmitting downlink signals and/or channels and a terminal device receiving downlink signals and/or channels. Specifically, at the terminal device, synchronization signal are used to adjust timings of receiving radio frames or subframes, or OFDM symbols. At the terminal device, a synchronization signal is also used to detect a center frequency of a component carrier. At the terminal device, a synchronization signal is also used to detect the CP length of an OFDM symbol. At the terminal device, a synchronization signal is also used to identify the cell (base station device) from which the synchronization signal has been transmitted. In other words, at the terminal device, a synchronization signal is used to detect a cell identity of the cell from which the synchronization signal has been transmitted. Note that, at the terminal device, a synchronization signal may be used to perform Automation Gain Control (AGC). Note that, at the terminal device, a synchronization signal may be used to adjust a timing of processing symbol to be used for Fast Fourier Transform (FFT). Note that, at the terminal device, a synchronization signal may be used to calculate Reference Signal Received Power (RSRP). Note that a synchronization signal may be used to secure a channel on which the synchronization signal is to be transmitted.

A primary synchronization signal (first primary synchronization signal) and a secondary synchronization signal (first secondary synchronization signal) are transmitted on the downlink to promote cell searches. Cell search is a procedure performed by the terminal device to acquire time and frequency synchronization with the cell to detect a physical layer cell ID of the cell. E-UTRA cell search supports a flexible and general transmission bandwidth corresponding to six or more resource blocks.

A specific example of assignment (arrangement, mapping) of the primary synchronization signal and the secondary synchronization signal will be described. k is defined as a frequency domain, and l is identified as an index specifying a resource element in the time domain. Here, $N_{RB}^{DL}$ denotes the number of resource blocks specified based on configuration information about the downlink bandwidth, $N_{sc}^{RB}$ denotes a frequency domain resource block size corresponding to the number of subcarriers per resource block, and $N_{symb}^{DL}$ denotes the number of OFDM symbols per downlink slot. Here, au denotes a symbol in a resource element (k, l), d denotes a sequence, and n takes a value from 0 to $2N_M-1$. Moreover, mod denotes a function representing a remainder, and A mod B denotes a remainder in a case that A is divided by B. Here, for the primary synchronization signal and the secondary synchronization signal, $N_M$ is 31. Here, for the primary synchronization signal and the secondary synchronization signal, h is 1.

The Primary Synchronization Signal (PSS) and the Secondary Synchronization Signal (SSS) illustrated in FIG. 1 are transmitted using 62 subcarriers (62 resource elements) around a center frequency regardless of the downlink bandwidth (a system bandwidth of the downlink, a downlink transmission bandwidth). A Direct-Current subcarrier (DC subcarrier) corresponding to the center of the subcarriers within the system bandwidth is not used as the primary synchronization signal or the secondary synchronization signal. Five subcarriers (five resource elements) at each of opposite ends of each of the primary synchronization signal and the secondary synchronization signal are reserved and not used for transmission of the primary synchronization signal or the secondary synchronization signal. The resource elements including the five resource elements at each end in addition to the above-described 62 resource elements are referred to as the primary synchronization signal and the secondary synchronization signal.

The primary synchronization signal is generated based on a Zadoff-Chu sequence (ZC sequence) in the frequency domain. $N_{ZC}$ denotes a sequence length of the Zadoff-Chu sequence, and u denotes a root index (Zadoff-Chu root sequence index). The primary synchronization signal is generated based on three types of root indices. Each of the root indices is associated with three specific identifiers derived from the cell identity (cell ID, physical-layer cell identity). In frame structure type 1, the primary synchronization signal is assigned to the last OFDM symbols of slot 0 (i.e., the first slot of subframe 0) and slot 10 (i.e., the first slot of subframe 5). In frame structure type 2, the primary synchronization signal is assigned to the third OFDM symbols of the first slots of subframes 1 and 6.

The secondary synchronization signal is defined by a combination of two sequences each having a length of 31. A sequence used for the secondary synchronization signal is obtained by interleaving and combining the two sequences each having a length of 31. The sequence resulting from the combining is scrambled with a scramble sequence provided by the primary synchronization signal. The sequence having a length of 31 is generated based on an M sequence. The sequence having a length of 31 is generated based on 168 specific physical layer cell identity groups derived from the cell identity. The scramble sequence provided by the primary synchronization signal is an M sequence generated based on three specific identifiers. Mapping of the sequence of the secondary synchronization signal on the resource elements depends on a frame structure. In frame structure type 1, the secondary synchronization signal is assigned to the second OFDM symbol from the last OFDM symbol of slot 0 (i.e., the first slot of subframe 0) and slot 10 (i.e., the first slot of subframe 5). In frame structure type 2, the secondary synchronization signal is assigned to the last OFDM symbols of slot 1 (i.e., the second slot of subframe 0) and slot 11 (i.e., the second slot of subframe 5).

Although not illustrated here, a physical broadcast information channel may be allocated and a downlink Reference Signal (RS) may be assigned, to a downlink subframe. Examples of a downlink reference signal are a Cell-specific RS (CRS), which is transmitted through the same transmission port as that for a PDCCH, a Channel State Information RS (CSI-RS, non-zero power CSI-RS, NZP CSI-RS), which is used to measure Channel State Information (CSI), a terminal-specific RS (UE-specific RS (URS)), which is transmitted through the same transmission port as that for one or some PDSCHs, and a DeModulation RS (DMRS), which is transmitted through the same transmission port as that for an EPDCCH. Moreover, carriers on which no CRS is mapped may be used. In this case, a similar signal (referred to as "enhanced synchronization signal") to a signal corresponding to one or some transmission ports (e.g., only transmission port 0) or all the transmission ports for the CRSs can be inserted into one or some subframes (e.g., the first and sixth subframes in the radio frame) as time and/or frequency tracking signals. The terminal-specific reference signals transmitted at the same transmission port as part of PDSCHs are also referred to as terminal-specific reference signals or DMRSs associated with PDSCHs. The demodulation reference signals transmitted at the same transmission port as the EPDCCHs are also referred to as DMRSs associated with the EPDCCHs.

Although not illustrated here, in the downlink subframe, Zero Power CSI-RS (ZP CSI-RS) mostly used for rate matching of the PDSCH, which is transmitted simultaneously with the downlink subframe, and CSI Interference Management (CSI-IM) mostly used for interference measurement of channel state information may be mapped. The zero power CSI-RS and the CSI-IM may be arranged on resource elements where the non-zero power CSI-RS can be mapped. The CSI-IM may be configured to overlap the non-zero CSI-RS.

Although not illustrated, Discovery Signals (DSs) may be arranged in downlink subframes. In a certain cell, a DS (DS Occasion) is constituted of a time period (DS period) of a prescribed number of contiguous subframes. The prescribed number is one to five according to FDD (Frame structure type 1) and two to five according to TDD (Frame structure type 2). The prescribed number is configured by the RRC signaling. The terminal device is configured to have an occasion when the DS period is measured. The configuration of the occasion when the DS period is measured is also referred to as a Discovery signals Measurement Timing Configuration (DMTC). The occasion (DMTC Occasion) when the terminal device measures the DS period is configured by an occasion corresponding to 6 ms (six subframes). The terminal assumes that the DS is transmitted (is mapped or occurs) per subframe configured by a parameter dmtc-Periodicity configured by the RRC signaling. The terminal assumes a presence of the DS configured to include following signals in downlink subframes.

(1) A CRS of antenna port 0 in a DwPTS of all downlink subframes and all special subframes in the DS period.

(2) A PSS in a first subframe of the DS period according to FDD. A PSS in the second subframe of the DS period according to TDD.

(3) A SSS in the first subframe of the DS period.

(4) A non-zero power CSI-RS in a zero or more subframes of the DS period. This non-zero power CSI-RS is configured by the RRC signaling.

The terminal performs measurements based on the configured DS. The measurements are performed by using the CRS of the DS or the non-zero power CSI-RS of the DS. The configuration related to the DS can configure multiple non-zero power CSI-RSs.

Figure 2:
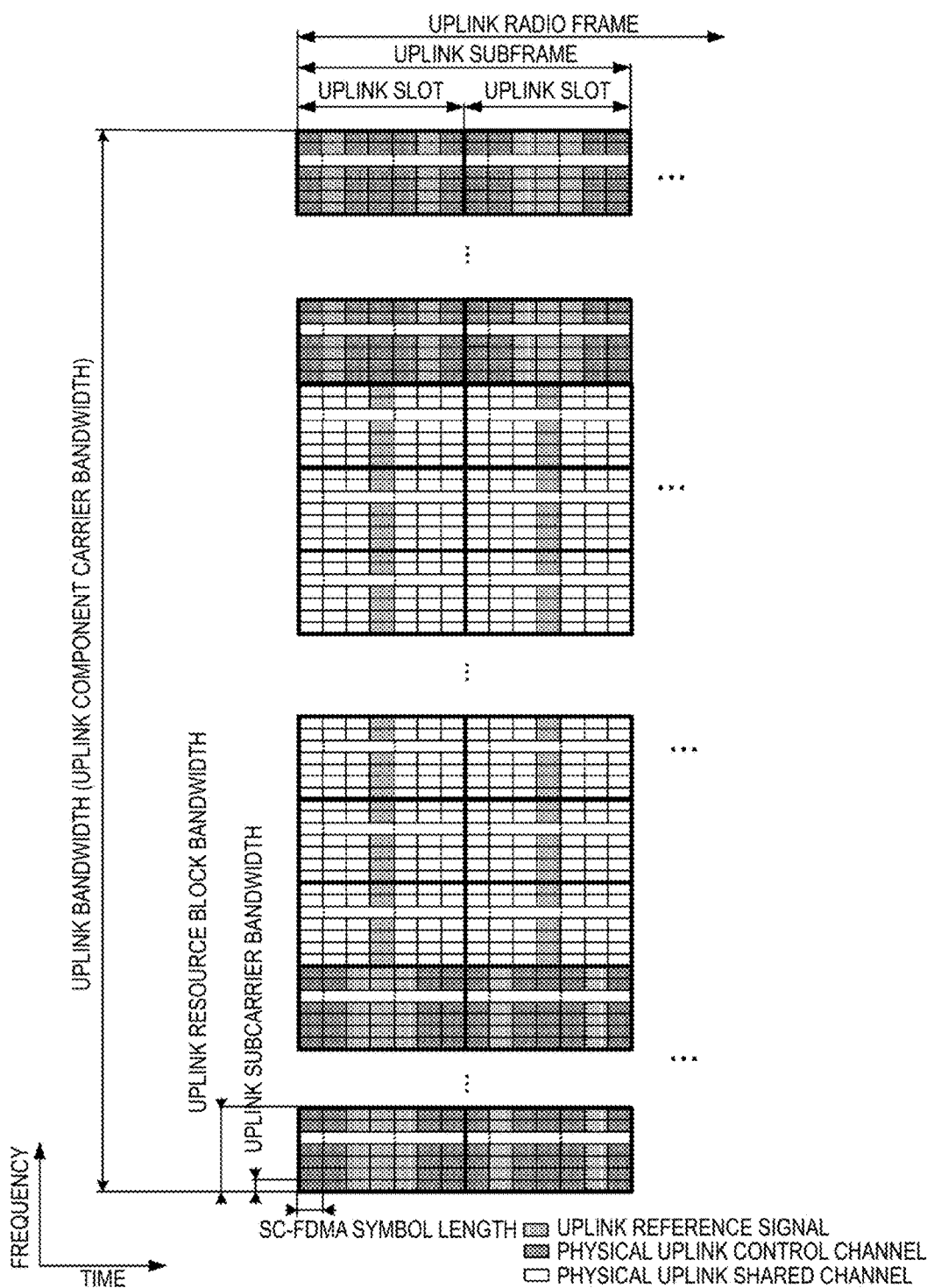
FIG. 2 is a diagram illustrating an example of an uplink radio frame configuration according to the present embodiment.

FIG. 2 is a diagram illustrating an example of an uplink radio frame configuration according to the present embodiment. An SC-FDMA scheme is used in the uplink. Transmission of an uplink signal and/or on an uplink physical channel in the uplink is referred to as an uplink transmission. That is, the uplink transmission can be rephrased as transmission of a PUSCH. In the uplink, a Physical Uplink Shared CHannel (PUSCH), a PUCCH, and the like are allocated. An uplink reference signal is assigned to one or some of PUSCHs and PUCCHs. An uplink radio frame is constituted of uplink RB pairs. This uplink RB pair is a unit for allocation of uplink radio resources and the like and is constituted by the frequency band of a predefined width (RB bandwidth) and a predetermined time duration (two slots=1 subframe). Each of the uplink RB pairs is constituted of two uplink RBs (RB bandwidth×slot) that are contiguous in the time domain. Each of the uplink RB is constituted of 12 subcarriers in the frequency domain. In the time domain, the uplink RB is constituted of seven SC-FDMA symbols in a case that a normal cyclic prefix is added, while the uplink RB is constituted of six SC-FDMA symbols in a case that a cyclic prefix that is longer than the normal cyclic prefix is added. Note that although an uplink subframe in a single CC is described here, an uplink subframe is defined for each CC. For compensation of propagation delay and the like, the beginning of the radio frame in the uplink (uplink subframe) is adjusted to precede the beginning of the radio frame in the downlink (downlink subframe), with respect to the terminal device.

A synchronization signal is constituted by three kinds of primary synchronization signals and secondary synchronization signals constituted by 31 kinds of codes that are interleaved in the frequency region. 504 patterns of cell identifiers (Physical Cell Identities: PCIs) for identifying base station devices, and frame timing for radio synchronization are indicated by the combinations of the primary synchronization signals and the secondary synchronization signals. The terminal device identifies the physical cell ID of a received synchronization signal by cell search.

The Physical Broadcast CHannel (PBCH) is transmitted for the notification (configuration) of a control parameter (broadcast information i.e., system information) commonly used among the terminal devices within the cell. The radio resource in which broadcast information is transmitted is announced on the physical downlink control channel to the terminal devices in the cell. Broadcast information not announced on the physical broadcast information channel is transmitted, as a layer-3 message (system information) for announcing the broadcast information of the physical downlink shared channel, by the announced radio resource.

Broadcast information to be notified includes, for example, a Cell Global Identifier (CGI), which indicates a cell-specific identifier, a Tracking Area Identifier (TAI) for managing standby areas in paging, random access configuration information (such as a transmission timing timer), and shared radio resource configuration information, neighboring cell information and uplink access control information of the cell.

A downlink reference signal is classified into a plurality of types according to its use. For example, cell-specific RSs (Cell-specific reference signals) are pilot signals transmitted with prescribed power from each cell and are downlink reference signals periodically repeated in the frequency domain and the time domain under a prescribed rule. The terminal device receives the cell-specific RS and thus measures the reception quality of each cell. The terminal device also uses a cell-specific RS as a reference signal for demodulation of a physical downlink control channel or a physical downlink shared channel transmitted at the same time as a cell-specific RS. A sequence distinguishable among the cells can be used for a sequence for a cell-specific RS.

The downlink reference signal is also used for estimation of downlink channel fluctuation. A downlink reference signal used for estimation of downlink channel fluctuations is referred to as "Channel State Information Reference Signal (CSI-RS)". A downlink reference signal individually configured for the terminal device is referred to as UE-specific Reference signal (URS), a DeModulation Reference Signal (DMRS), or a Dedicated RS (DRS), and is referred to for a channel compensation process for demodulating an enhanced physical downlink control channel or a physical downlink shared channel.

The Physical Downlink Control CHannel (PDCCH) occupying one or several OFDM symbols (e.g., 1 to 4 OFDM symbols) from the start of each subframe is transmitted. The Enhanced Physical Downlink Control CHannel (EPDCCH) is a physical downlink control channel allocated to the OFDM symbols to which the Physical Downlink Shared CHannel (PDSCH) is allocated. The PDCCH or EPDCCH is used for notifying each terminal device of radio resource allocation information according to scheduling determined by the base station device and information indicating an adjustment amount for an increase or decrease in transmit power. In the following, even in a case that the Physical Downlink Control CHannel (PDCCH) alone is described, both physical channels that is, the PDCCH and the EPDCCH, are included unless otherwise noted.

The terminal device needs to monitor a physical downlink control channel addressed to the terminal device itself, and receive the physical downlink control channel addressed to the terminal device itself, before transmitting and/or receiving downlink data or a layer-2 message or layer-3 message, which is higher-layer control information (such as a paging or handover command), and thereby acquire, from the physical downlink control channel, radio resource allocation information called uplink grant in a case of transmission and downlink grant (downlink assignment) in a case of reception. Note that it is also possible to constitute the physical downlink control channel so that the physical downlink control channel is to be transmitted in the dedicated resource block domain allocated to each terminal device by the base station device, instead of transmission through OFDM symbols described above. The uplink grant can be rephrased as a DCI format used for scheduling the PUSCH. The downlink grant can be rephrased as a DCI format used for scheduling the PDSCH. The subframe for which the PDSCH is scheduled is a subframe for which the DCI format indicating reception of the PDSCH, has been successfully decoded. The subframe for which the PUSCH is scheduled is indicated in association with the subframe for which the DCI format indicating transmission of the PUSCH has been successfully decoded. For example, for FDD cells, the subframe for which the PUSCH is scheduled is the fourth subframe following the subframe for which the DCI format indicating transmission of the PDSCH has been successfully decoded. In other words, each of the subframes for which the PUSCH and the PDSCH are scheduled is associated with the subframe for which the DCI format indicating the transmission or reception of the channel has been successfully decoded.

The Physical Uplink Control CHannel (PUCCH) is used for an acknowledgment in response to reception of downlink data transmitted on the physical downlink shared channel (HARQ-ACK: Hybrid Automatic Repeat reQuest-Acknowledgment or ACK/NACK; Acknowledgment/Negative Acknowledgment), downlink channel (Channel State) Information (CSI), and uplink radio resource allocation request (radio resource request, Scheduling Request (SR)).

CSI includes a Channel Quality Indicator (CQI) of the serving cell corresponding to the CSI, a Precoding Matrix Indicator (PMI), a Precoding Type Indicator (PTI), and a Rank Indicator (RI), which can be used respectively for specifying (representing) a preferable modulation scheme and coding rate, a preferable precoding matrix, a preferable PMI type, and a preferable rank. Indication may be used as a notation for each indicator. Moreover, the CQI and the PMI are classified into wideband CQI and PMI assuming transmission using all the resource blocks in a single cell, and subband CQI and PMI assuming transmission using some contiguous resource blocks (subbands) in a single cell. Moreover, PMI may include a type of PMI, which represents a single preferable precoding matrix using two types of PMIs, which are a first PMI and a second PMI, in addition to a normal type of PMI, which represents a single preferable precoding matrix using a single PMI.

For example, the terminal device 1 reports a CQI index that satisfies a condition that an error probability of one PDSCH transport occupying a group of downlink physical resource blocks and determined by a combination of a modulation scheme and a transport block size corresponding to the CQI index, does not exceed a prescribed value (for example, 0.1).

Note that each of the downlink physical resource blocks used to calculate the CQI, the PMI, and/or the RI is referred to as a CSI reference resource.

The terminal device 1 reports the CSI to the base station device 2. The CSI reporting includes periodic CSI reporting and aperiodic CSI reporting. In the periodic CSI reporting, the terminal device 1 reports the CSI at a timing configured by a higher layer. In the aperiodic CSI reporting, the terminal device 1 reports the CSI at a timing based on CSI request information included in the received uplink DCI format (uplink grant) or a random access response grant.

The terminal device 1 reports the CQI and/or the PMI and/or the RI. Note that the terminal device 1 need not report the PMI and/or the RI depending on a configuration made by a higher layer. The configuration made by the higher layer includes, for example, a transmission mode, a feedback mode, a reporting type, and a parameter indicating whether to report the PMI/RI.

Moreover, the terminal device 1 may be configured to perform one or multiple CSI processes for one serving cell. The CSI process is configured in association with the CSI reporting. One CSI process is associated with one CSI-RS resource and one CSI-IM resource.

The Physical Downlink Shared CHannel (PDSCH) is also used to notify the terminal device of a response to random access (Random Access Response (RAR)) and broadcast information (system information) that is not notified by paging or on the physical broadcast information channel, in addition to downlink data, as a layer-3 message. Radio resource allocation information of the physical downlink shared channel is indicated by a physical downlink control channel. The physical downlink shared channel is allocated to OFDM symbols other than the OFDM symbols used to transmit a physical downlink control channel and is transmitted. In other words, the physical downlink shared channel and the physical downlink control channel are time division multiplexed in a single subframe.

The Physical Uplink Shared CHannel (PUSCH) mainly transmits uplink data and uplink control information which may also include uplink control information such as CSI and ACK/NACK. Moreover, the physical uplink shared channel is also used such that the terminal device notifies the base station device of uplink data as well as a layer-2 message and a layer-3 message, which are higher-layer control information. Radio resource allocation information of the physical uplink shared channel is provided by a physical downlink control channel, as in a case of downlink.

An uplink reference signal (also referred to as "uplink pilot signal" or "uplink pilot channel") includes a DeModulation Reference Signal (DMRS) to be used by the base station device to demodulate the physical uplink control CHannel PUCCH and/or physical uplink shared CHannel PUSCH, and a Sounding Reference Signal (SRS) to be mainly used by the base station device to estimate an uplink channel state. Moreover, sounding reference signals are categorized into a Periodic Sounding Reference Signal (Periodic SRS), which is transmitted periodically, or an Aperiodic Sounding Reference Signal (Aperiodic SRS), which is transmitted in a case that transmission is instructed by the base station device.

A Physical Random Access CHannel (PRACH) is a channel used for the notification (configuration) of a preamble sequence and includes a guard time. The preamble sequence is configured such that multiple sequences are sued for notifying information to the base station device. For example, in a case that 64 sequences are available, 6-bit information can be provided to the base station device. A physical random access channel is used by the terminal device as a means for accessing the base station device.

The terminal device uses the physical random access channel to request an uplink radio resource in a case that no physical uplink control channel is configured for an SR or to request the base station device for a transmission timing adjustment information (also referred to as Timing Advance (TA) command) necessary for matching uplink transmission timing to a reception timing window of the base station device, for example. Moreover, the base station device can request the terminal device to start a random access procedure, by using a physical downlink control channel.

The random access response is response information from the base station device for random access by the terminal device. The random access response is included in the PDSCH scheduled based on control information for the PDCCH having CRC scrambled with RA-RNTI, and the PDSCH is transmitted from the base station device. The random access response includes transmission timing adjustment information, the uplink grant (the uplink grant included in the random access response is also referred to as a random access response grant), Temporary C-RNTI information, which is a temporary identifier of the terminal device.

A layer-3 message is a message exchanged between the Radio Resource Control (RRC) layers of the terminal device and the base station device and handled in a protocol for a Control-plane (CP (C-Plane)), and may be used synonymly with RRC signaling or RRC message. A protocol handling user data (uplink data and downlink data) is referred to as "User-plane (UP (U-Plane))" in contrast to "control plane". Here, a transport block that is transmission data in the physical layer includes C-Plane messages and U-Plane data in higher layers. Detailed descriptions of other physical channels are omitted.

A communicable range (communication area) at each frequency controlled by a base station device is regarded as a cell. Here, the communication area covered by the base station device may be different in size and shape for each frequency. Moreover, the covered area may be different for each frequency. A radio network, in which cells having different types of base station devices or different cell radii are located in a mixed manner in the area with the same frequency and/or different frequencies to form a single communication system, is referred to as a heterogeneous network.

The terminal device operates by regarding the inside of a cell as a communication area. In a case that the terminal device moves from a cell to a different cell, the terminal device moves to an appropriate different cell through a cell reselection procedure at the time of having no radio connection (during no communication) and through a handover procedure at the time of having radio connection (during communication). A suitable cell in general indicates a cell that is determined that access from the terminal device is not prohibited based on information specified by the base station device, and that has a downlink reception quality satisfying a predefined condition.

Moreover, the terminal device and the base station device may employ a technique for aggregating the frequencies (component carriers or frequency band) of a plurality of different frequency bands through Carrier Aggregation and treating the resultant as a single frequency (frequency band). A component carrier is categorized as an uplink component carrier corresponding to the uplink and a downlink component carrier corresponding to the downlink. In this specification, "frequency" and "frequency band" may be used synonymously.

For example, in a case that each of five component carriers having frequency bandwidths of 20 MHz are aggregated through Carrier Aggregation, a terminal device capable of performing Carrier Aggregation performs transmission and/or reception by assuming that the aggregated carriers have a frequency bandwidth of 100 MHz. Note that component carriers to be aggregated may have contiguous frequencies or frequencies some or all of which are discontiguous. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band.

It is also possible to aggregate multiple contiguous or discontiguous component carriers of the same frequency bands. The frequency bandwidth of each component carrier may be narrower (e.g., 5 MHz or 10 MHz) than the receivable frequency bandwidth (e.g., 20 MHz) of the terminal device, and the frequency bandwidth of component carriers to be aggregated may be different from each other. Each frequency bandwidth may be equal to any of the frequency bandwidth of known cells in consideration of backward compatibility, but may be a frequency bandwidth different from any of the frequency bands of the known cells.

Moreover, component carriers (carrier types) without backward compatibility may be aggregated. Note that the number of uplink component carriers to be allocated to (configured for or added for) the terminal device by the base station device may be the same as or may be fewer than the number of downlink component carriers.

A cell constituted of an uplink component carrier in which an uplink control channel is configured for a radio resource request and a downlink component carrier having a cell-specific connection with the uplink component carrier is referred to as "Primary Cell (PCell)." A cell constituted of component carriers other than those of the primary cell is referred to as "Secondary Cell (SCell)." The terminal device receives a paging message, detects update of broadcast information, carries out an initial access procedure, configures security information, and the like in a primary cell, and need not perform these operations in secondary cells.

Although a primary cell is not a target of activation and deactivation controls (in other words, considered as being activated at any time), a secondary cell has activated and deactivated states, the change of which is explicitly specified by the base station device or is made based on a timer configured for the terminal device for each component carrier. The primary cell and secondary cell are collectively referred to as "serving cell".

Carrier Aggregation achieves communication using multiple component carriers (frequency bands) using multiple cells, and is also referred to as cell aggregation. The terminal device may have radio connection with the base station device via a relay station device (or repeater) for each frequency. In other words, the base station device of the present embodiment may be replaced with a relay station device.

The base station device manages a cell, which corresponds to an area where terminal devices can communicate with the base station device, for each frequency. A single base station device may manage multiple cells. Cells are classified into multiple types of cells depending on the size of the area (cell size) that allows for communication with terminal devices. For example, cells are classified into macro cells and small cells. Moreover, small cells are classified into femto cells, pico cells, and nano cells depending on the size of the area. In a case that a terminal device can communicate with a certain base station device, the cell configured so as to be used for the communication with the terminal device is referred to as "Serving cell" while the other cells not used for the communication are referred to as "Neighboring cell", among the cells of the base station device.

In other words, in Carrier Aggregation, a plurality of serving cells thus configured include one primary cell and one or a plurality of secondary cells.

A primary cell is a serving cell in which an initial connection establishment procedure has been carried out, a serving cell in which a connection re-establishment procedure has been started, or a cell indicated as a primary cell during a handover procedure. The primary cell operates at a primary frequency. At the point of time when a connection is (re)established, or later, a secondary cell may be configured. Each secondary cell operates at a secondary frequency. The connection may be referred to as an RRC connection. For the terminal device supporting CA, a single primary cell and one or more secondary cells are aggregated.

In the present embodiment, Licensed Assisted Access (LAA) is used. According to LAA, an allocated frequency is configured to (used for) the primary cell, and a non-allocated frequency is configured to at least one of secondary cells. The secondary cell(s) to which the non-allocated frequency is configured is assisted by the primary cell or the secondary cell(s) to which the allocated frequency is configured. For example, the primary cell(s) or the secondary cell to which the allocated frequency is configured performs the configuration and/or announces control information by the RRC signaling, MAC signaling and/or PDCCH signaling to the secondary cell(s) to which the non-allocated frequency is configured. In the present embodiment, a cell assisted by the primary cell or the secondary cell(s) is also referred to as "LAA cell". The LAA cell can be aggregated (assisted) with the primary cell and/or the secondary cell(s) by carrier aggregation. The primary cell or the secondary cell(s) which assists the LAA cell is also referred to as "assist cell".

The LAA cell may be aggregated (assisted) by the primary cell and/or the secondary cell(s) by dual connectivity.

A basic configuration (architecture) of dual connectivity will be described below. For example, the description will be given in a case that a terminal device 1 connects to multiple base stations 2 (for example, a base station device 2-1 and a base station device 2-2) at the same time. The base station device 2-1 is a base station device constituting a macro cell, and the base station device 2-2 is a base station device constituting a small cell. The terminal device 1 connecting to the base station devices 2 at the same time by using the plurality of cells belonging to the plurality of base station devices 2 as described above is referred to as "dual connectivity". The cells belonging to the respective base station devices 2 may be operated at the same frequency or different frequencies.

Note that Carrier Aggregation is different from dual connectivity in that a single one of the base station devices 2 manages a plurality of cells and the frequencies of the respective cells are different from each other. In other words, Carrier Aggregation is a technique for connecting the single terminal device 1 and a single one of the base station device 2 via a plurality of cells having different frequencies, while dual connectivity is a technique for connecting the single terminal device 1 and the plurality of base station devices 2 via a plurality of cells having the same frequency or different frequencies.

The terminal device 1 and base station devices 2 can apply a technique used for Carrier Aggregation, to dual connectivity. For example, the terminal device 1 and base station devices 2 may apply a technique of allocation of a primary cell and secondary cells or activation/deactivation, to cells connected through dual connectivity.

In dual connectivity, the base station device 2-1 or base station device 2-2 is connected to MME and SGW via a backbone network. The MME is a host control station device corresponding to a Mobility Management Entity (MME) and has the functions of managing mobility and performing authentication control (security control) for the terminal device 1, and configuring routes for user data to the base station devices 2. The SGW is a host control station device corresponding to a Serving GateWay (S-GW) and has the functions of transmitting user data according to the route for user data to the terminal device 1 configured by the MME.

Moreover, in dual connectivity, the connection route between the base station device 2-1 or base station device 2-2 and the SGW is referred to as an "SGW interface". Moreover, the connection route between the base station device 2-1 or base station device 2-2 and the MME is referred to as "MME interface". Moreover, the connection route between the base station device 2-1 and base station device 2-2 is referred to as "base station interface". The SGW interface is also referred to as an S1-U interface in EUTRA. Moreover, the MME interface is also referred to as "S1-MME interface" in EUTRA. Moreover, the base station interface is also referred to as "X2 interface" in EUTRA.

An example of an architecture for enabling dual connectivity will be described. In dual connectivity, the base station device 2-1 and the MME are connected via the MME interface. Moreover, the base station device 2-1 and the SGW are connected via the SGW interface. Moreover, the base station device 2-1 provides, to the base station device 2-2, the communication route to the MME and/or SGW via the base station interface. In other words, the base station device 2-2 is connected to the MME and/or the SGW via the base station device 2-1.

Moreover, another example of another architecture for enabling dual connectivity will be described. In dual connectivity, the base station device 2-1 and the MME are connected via the MME interface. Moreover, the base station device 2-1 and the SGW are connected via the SGW interface. The base station device 2-1 provides, to the base station device 2-2, the communication route to the MME via the base station interface. In other words, the base station device 2-2 is connected to the MME via the base station device 2-1. Moreover, the base station device 2-2 is connected to the SGW via the SGW interface.

Note that a constitution in which the base station device 2-2 and the MME are directly connected via the MME interface may be employed.

On the basis of description from a different point of view, dual connectivity is an operation whereby a prescribed terminal device consumes radio resources provided from at least two different network points (master base station device (MeNB or Master eNB) and secondary base station device (SeNB or Secondary eNB)). In other words, in dual connectivity, a terminal device is configured to establish an RRC connection to at least two network points. In dual connectivity, the terminal device may be connected via a non-ideal backhaul in RRC connected (RRC_CONNECTED) state.

In dual connectivity, a base station device that is connected to at least the S1-MME and that acts as the mobility anchor of the core network is referred to as "master base station device". Moreover, a base station device that is not the master base station device and that provides supplemental radio resources to the terminal device is referred to as "secondary base station device." A group of serving cells that is associated with the master base station device may be referred to as "Master Cell Group" (MCG), and a group of serving cells that is associated with the secondary base station device may be referred to as "Secondary Cell Group" (SCG). Note that the cell groups may be serving cell groups.

In dual connectivity, the primary cell belongs to the MCG. Moreover, in the SCG, the secondary cell corresponding to the primary cell is referred to as "Primary Secondary Cell" (pSCell). Note that the pSCell may be referred to as "special cell" or "Special Secondary Cell" (Special SCell). Some of the functions (for example, functions for transmitting and/or receiving a PUCCH) of the PCell (the base station device constituting the PCell) may be supported by the Special SCell (the base station device constituting the Special SCell). Additionally, some of the functions of the PCell may be supported in the pSCell. For example, the function for transmitting a PDCCH may be supported by the pSCell. Additionally, the function for performing a PDCCH transmission may be supported in the pSCell by using a search space different from a Common Search Space (CSS) or a UE-specific Search Space (USS). For example, the search space different from a USS is a search space determined based on a value defined in the specification, a search space determined based on an RNTI different from a C-RNTI, a search space determined based on a value configured by a higher layer that is different from the RNTI, or the like. Moreover, the pSCell may constantly be in a starting state. Moreover, the pSCell is a cell capable of receiving the PUCCH.

In dual connectivity, the Data Radio Bearer (DRB) may be individually allocated to the MeNB and the SeNB. On the other hand, the Signalling Radio Bearer (SRB) may be allocated only to the MeNB. In dual connectivity, a duplex mode may be configured individually for the MCG and the SCG or the PCell and the pSCell. In dual connectivity, the MCG and the SCG or the PCell and the pSCell need not necessarily be synchronized with each other. In dual connectivity, a plurality of parameters for timing adjustment (TAG or Timing Advance Group) may be configured for each of the MCG and the SCG. In other words, the terminal device is capable of performing uplink transmission at a plurality of different timings in each CG.

In dual connectivity, the terminal device is allowed to transmit UCI corresponding to the cells in the MCG only to the MeNB (the PCell) and to transmit UCI corresponding to the cells in the SCG to SeNB (the pSCell) only. For example, the UCI is an SR, HARQ-ACK, and/or CSI. Additionally, in each UCI transmission, a transmission method using the PUCCH and/or the PUSCH is applied to each cell group.

All signals can be transmitted and/or received in the primary cell, but some signals may not be transmitted and/or received in the secondary cell. For example, a Physical Uplink Control CHannel (PUCCH) is transmitted only in the primary cell. Additionally, unless a plurality of Timing Advance Groups (TAGs) are configured between the cells, a Physical Random Access CHannel (PRACH) is transmitted only in the primary cell. Additionally, a Physical Broadcast CHannel (PBCH) is transmitted only in the primary cell. Additionally, a Master Information Block (MIB) is transmitted only in the primary cell. Signals that can be transmitted and/or received in the primary cell are transmitted and/or received in the primary secondary cell. For example, the PUCCH may be transmitted in the primary secondary cell. Additionally, the PRACH may be transmitted in the primary secondary cell, regardless of whether a plurality of TAGs are configured. Additionally, the PBCH and the MIB may be transmitted in the primary secondary cell.

In the primary cell, Radio Link Failure (RLF) is detected. In the secondary cell, even if conditions for the detection of RLF are in place, the detection of the RLF is not recognized. However, in the primary secondary cell, the RLF is detected if the conditions are in place. In a case that an RLF is detected in the primary secondary cell, the higher layer of the primary secondary cell announces, to the higher layer of the primary cell, that the RLF has been detected. Semi-Persistent Scheduling (SPS) or Discontinuous Reception (DRX) may be used in the primary cell. The same DRX as in the primary cell may be used in the secondary cell. Fundamentally, in the secondary cell, the MAC configuration information/parameters are shared with the primary cell/primary secondary cell of the same call group. Some of the parameters (for example, sTAG-Id) may be configured for each secondary cell. Some of the timers or counters may be applied only to the primary cell and/or the primary secondary cell. A timer or counter to be applied may be configured only to the secondary cell.

In an example where dual connectivity is applied to the LAA cell, the MCG (base station device 2-1) is a base station device which constitutes the primary cell. The SCG (base station device 2-2) is a base station device which constitutes the LAA cell. In other words, the LAA cell is configured as pSCell of the SCG In another example where dual connectivity is applied to the LAA cell, the MCG is the base station device which constitutes the primary cell, and the SCG is the base station device which constitutes the pSCell and the LAA cell. In other words, the LAA cell is assisted by the pSCell in the SCG. Note that in a case that the secondary cell is further configured to the SCG, the LAA cell may be assisted by the secondary cell.

In still another example where dual connectivity is applied to the LAA cell, the MCG is the base station device which constitutes the primary cell and the LAA cell, and the SCG is the base station device which constitutes the pSCell. In other words, the LAA cell is assisted by the primary cell in the MCG. Note that in a case that the secondary cell is further configured to the MCG, the LAA cell may be assisted by the secondary cell.

Figure 3:
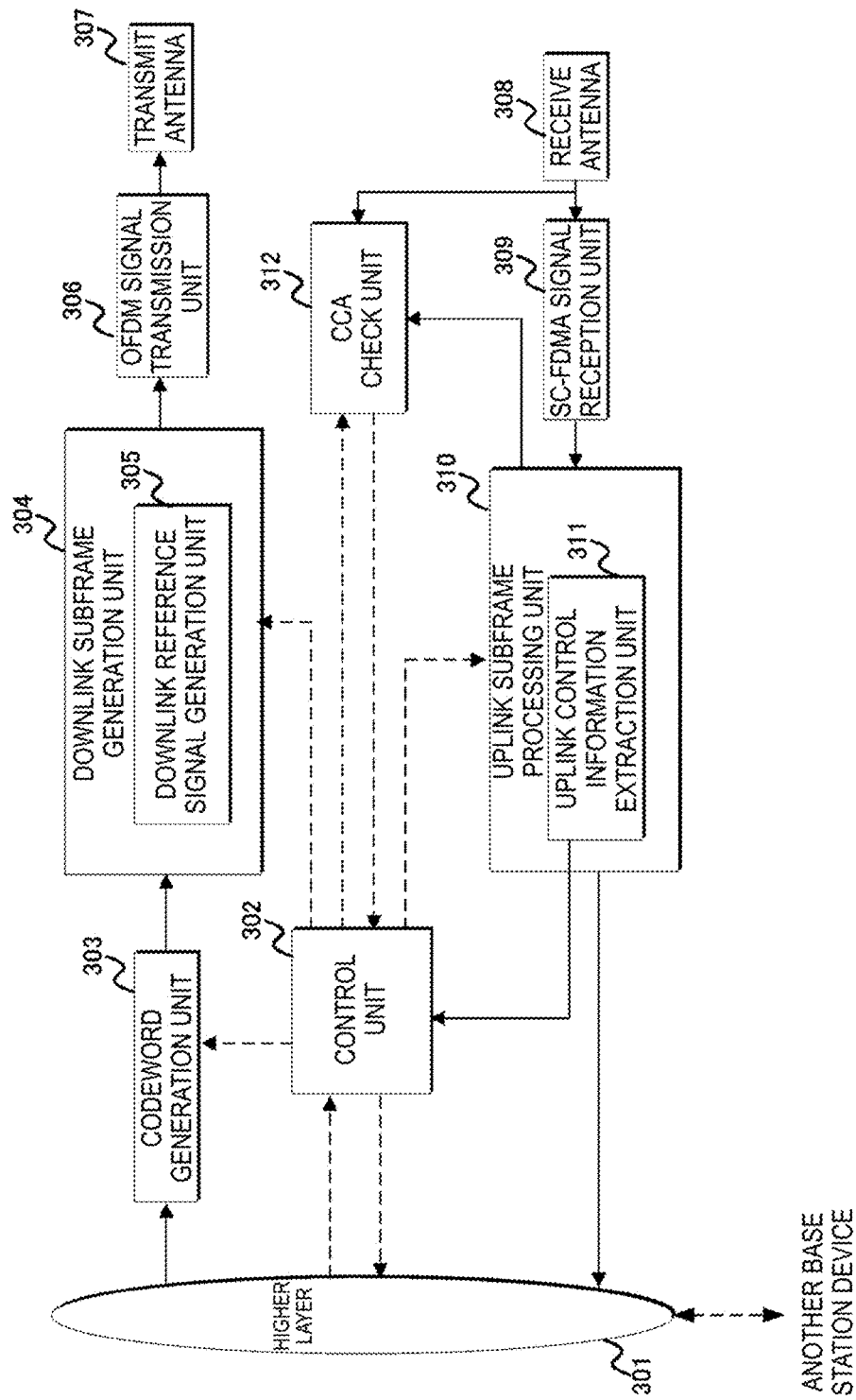
FIG. 3 is a schematic diagram illustrating an example of a block configuration of a base station device 2 according to the present embodiment.

FIG. 3 is a schematic diagram illustrating an example of a block configuration of a base station device 2 according to the present embodiment. The base station device 2 includes a higher layer (higher-layer control information notification unit, higher layer processing unit) 301, a control unit (base station control unit) 302, a codeword generation unit 303, a downlink subframe generation unit 304, an OFDM signal transmission unit (downlink transmission unit) 306, a transmit antenna (base station transmit antenna) 307, a receive antenna (base station receive antenna) 308, an SC-FDMA signal reception unit (CSI reception unit) 309, and an uplink subframe processing unit 310. The downlink subframe generation unit 304 includes a downlink reference signal generation unit 305. Moreover, the uplink subframe processing unit 310 includes an uplink control information extraction unit (CSI acquisition unit) 311.

Figure 4:
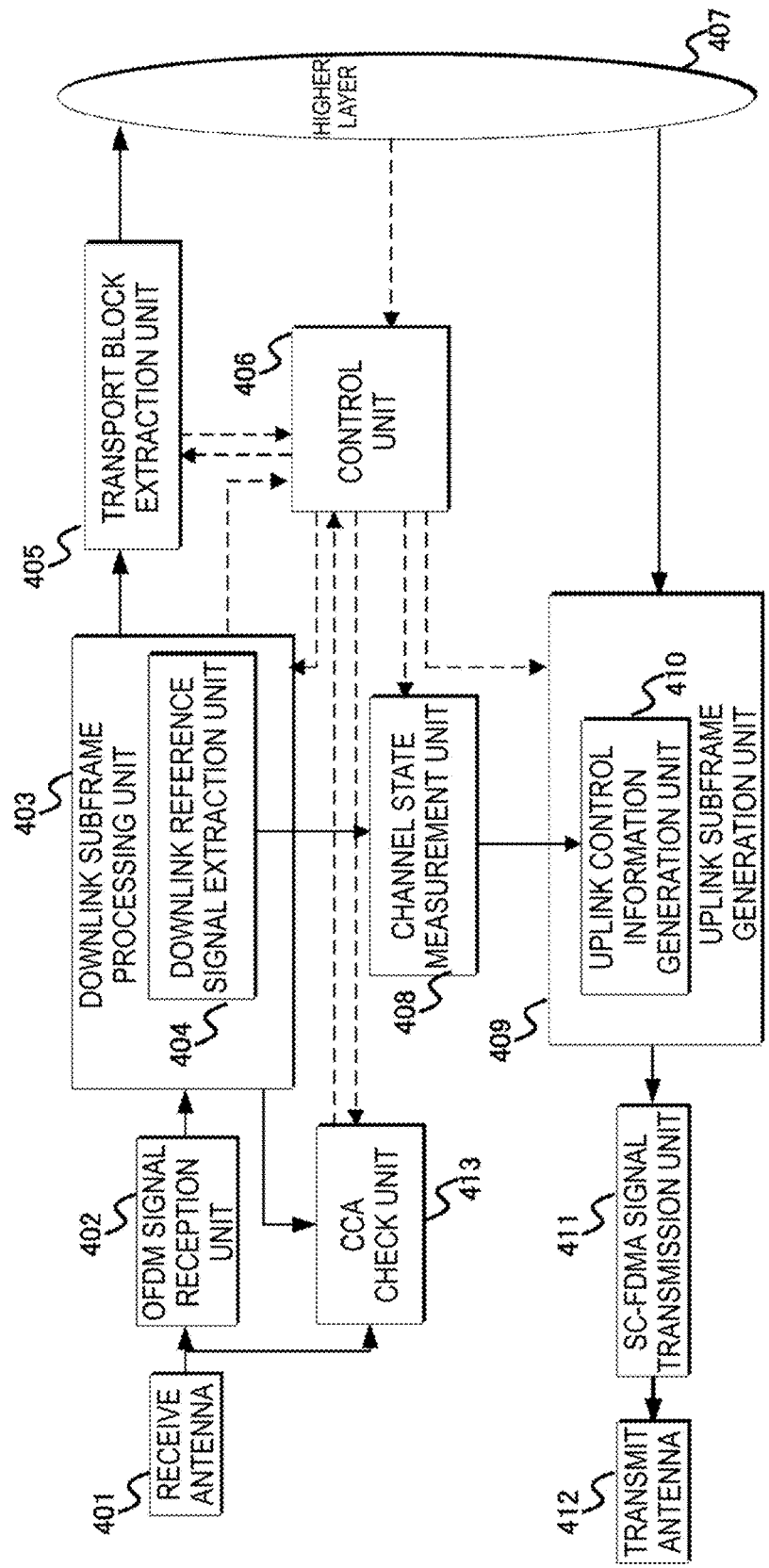
FIG. 4 is a schematic diagram illustrating an example of a block configuration of a terminal device 1 according to the present embodiment.

FIG. 4 is a schematic diagram illustrating an example of a block configuration of a terminal device 1 according to the present embodiment. The terminal device 1 includes a receive antenna (terminal receive antenna) 401, an OFDM signal reception unit (downlink reception unit) 402, a downlink subframe processing unit 403, a transport block extraction unit (data extraction unit) 405, a control unit (terminal control unit) 406, a higher layer (higher-layer control information acquisition unit, higher layer processing unit) 407, a channel state measurement unit (CSI generation unit) 408, an uplink subframe generation unit 409, an SC-FDMA signal transmission unit (UCI transmission unit) 411, and a transmit antenna (terminal transmit antenna) 412. The downlink subframe processing unit 403 includes a downlink reference signal extraction unit 404. Moreover, the uplink subframe generation unit 409 includes an uplink control information generation unit (UCI generation unit) 410.

First, a flow of downlink data transmission and/or reception will be described with reference to FIG. 3 and FIG. 4. In the base station device 2, the control unit 302 holds a Modulation and Coding Scheme (MCS) indicating a modulation scheme, a coding rate, and the like in the downlink, a downlink resource allocation indicating RBs to be used for data transmission, and information to be used for HARQ control (a redundancy version, an HARQ process number, and a new data indicator) and controls the codeword generation unit 303 and the downlink subframe generation unit 304, based on these elements. Downlink data (also referred to as a downlink transport block) transmitted from the higher layer 301 is processed through error correction coding, rate matching, and the like in the codeword generation unit 303 under the control of the control unit 302 and then, a codeword is generated. Two codewords at maximum are transmitted at the same time in a single subframe of a single cell. The control unit 302 instructs the downlink subframe generation unit 304 to generate a downlink subframe. First, a codeword generated in the codeword generation unit 303 is converted into a modulation symbol sequence through a modulation process, such as Phase Shift Keying (PSK) modulation or Quadrature Amplitude Modulation (QAM). Moreover, a modulation symbol sequence is mapped onto REs of some RBs, and a downlink subframe for each antenna port is generated through a precoding process. In this operation, the transmission data sequence transmitted from the higher layer 301 includes higher-layer control information, which is control information about the higher layer (e.g., dedicated (individual) Radio Resource Control (RRC) signaling). Furthermore, the downlink reference signal generation unit 305 generates a downlink reference signal. The downlink subframe generation unit 304 maps the downlink reference signal to the REs in the downlink subframes in accordance with an instruction from the control unit 302. The OFDM signal transmission unit 306 modulates the downlink subframe generated by the downlink subframe generation unit 304 to an OFDM signal, and then transmits the OFDM signal through the transmit antenna 307. Although a configuration of including one OFDM signal transmission unit 306 and one transmit antenna 307 is illustrated as an example here, a configuration of including multiple OFDM signal transmission units 306 and multiple transmit antennas 307 may be employed for transmitting downlink subframes through multiple antenna ports. Furthermore, the downlink subframe generation unit 304 may also have a capability of generating physical-layer downlink control channels, such as a PDCCH and an EPDCCH to map the channels to REs in downlink subframes. Multiple base station devices (base station device 2-1 and base station device 2-2) transmit separate downlink subframes. Note that the base station device 2 that operates in the LAA cell is configured to include a CCA check unit 312 configured to determine whether the channel is idle or busy. The CCA check unit 312 is implemented with a method for determination using power received through the receive antenna 308, a method for a determination depending on whether a specific signal from the uplink subframe processing unit 310 has been detected, and the like. A determination result from the CCA check unit 312 is transmitted to the control unit 302 and used to control the transmission.

In the terminal device 1, an OFDM signal is received by the OFDM signal reception unit 402 through the receive antenna 401, and an OFDM demodulation process is performed on the signal. The downlink subframe processing unit 403 first detects physical-layer downlink control channels, such as a PDCCH and an EPDCCH. More specifically, the downlink subframe processing unit 403 decodes the signal by assuming that a PDCCH and an EPDCCH have been transmitted in the regions to which the PDCCH and the EPDCCH can be allocated, and checks Cyclic Redundancy Check (CRC) bits added in advance (blind decoding). In other words, the downlink subframe processing unit 403 monitors a PDCCH and an EPDCCH. In a case that the CRC bits match an ID (a single terminal-specific identifier assigned to a single terminal, such as a Cell-Radio Network Temporary Identifier (C-RNTI) or a Semi Persistent Scheduling-C-RNTI (SPS-C-RNTI), or a Temporary C-RNTI) assigned by the base station device beforehand, the downlink subframe processing unit 403 recognizes that a PDCCH or an EPDCCH has been detected and extracts a PDSCH by using control information included in the detected PDCCH or EPDCCH. The control unit 406 holds an MCS indicating a modulation scheme, a coding rate, and the like in the downlink based on the control information, a downlink resource allocation indicating RBs to be used for downlink data transmission, and information to be used for HARQ control, and controls the downlink subframe processing unit 403, the transport block extraction unit 405, and the like, in accordance with these elements. More specifically, the control unit 406 performs control so as to carry out an RE mapping process in the downlink subframe generation unit 304, an RE demapping process and demodulation process corresponding to the modulation process, and the like. The PDSCH extracted from the received downlink subframe is transmitted to the transport block extraction unit 405. Furthermore, the downlink reference signal extraction unit 404 in the downlink subframe processing unit 403 extracts the downlink reference signal from the downlink subframe. The transport block extraction unit 405 extracts a transport block that has been subjected to a rate matching process, a rate matching process corresponding to error correction coding, error correction decoding, and the like in the codeword generation unit 303, and transmits the extracted transport block to the higher layer 407. The transport block includes higher-layer control information, and the higher layer 407 notifies the control unit 406 of a necessary physical-layer parameter, based on the higher-layer control information. The plurality of base station devices 2 (base station device 2-1 and base station device 2-2) transmit separate downlink subframes, and the terminal device 1 receives the downlink subframes. Hence, the above-described processes may be carried out for the downlink subframe of each of the plurality of base station devices 2. In this situation, the terminal device 1 may recognize or may not necessarily recognize that multiple downlink subframes have been transmitted from the multiple base station devices 2. In a case that the terminal device 1 does not recognize the subframes, the terminal device 1 may simply recognize that multiple downlinks subframes have been transmitted in multiple cells. Moreover, the transport block extraction unit 405 determines whether the transport block has been detected correctly, and transmits a determination result to the control unit 406. Note that the terminal device 1 that operates in the LAA cell is configured to include a CCA check unit 413 configured to determine whether the channel is idle or busy. The CCA check unit 413 is implemented with a method for determination using power received through the receive antenna 401, a method for determination depending on whether a specific signal from the downlink subframe processing unit 403 has been detected, and the like. A determination result from the CCA check unit 413 is transmitted to the control unit 406 and used to control the transmission.

Next, a flow of uplink signal transmission and/or reception will be described. In the terminal device 1, the control unit 406 instructs a downlink reference signal extracted by the downlink reference signal extraction unit 404 to be transmitted to the channel state measurement unit 408, and then instructs the channel state measurement unit 408 to measure the channel state and/or interference, and further to calculate CSI, based on the measured channel state and/or interference. The control unit 406 instructs the uplink control information generation unit 410 to generate an HARQ-ACK (DTX (not transmitted yet), ACK (detection success), or NACK (detection failure)) and to map the HARQ-ACK to a downlink subframe, based on a determination result of whether the transport block is correctly detected. The terminal device 1 performs these processes on the downlink subframe of each of multiple cells. In the uplink control information generation unit 410, a PUCCH including the calculated CSI and/or HARQ-ACK is generated. In the uplink subframe generation unit 409, the PUSCH including the uplink data transmitted from the higher layer 407 and the PUCCH generated by the uplink control information generation unit 410 are mapped to RBs in an uplink subframe, and an uplink subframe is generated. The uplink subframe is subjected to the SC-FDMA modulation in the SC-FDMA signal transmission unit 411 to generate an SC-FDMA signal, and the SC-FDMA signal transmission unit 411 transmits the SC-FDMA signal via the transmit antenna 412.

Here, the terminal device 1 performs (derives) channel measurement for calculating the value of the CQI, based on the CRS or the CSI-RS (non-zero power CSI-RS). Whether the terminal device 1 derives the channel measurement, based on the CRS or the CSI-RS, is determined according to higher layer signaling. Specifically, in a transmission mode configured with the CSI-RS, the terminal device 1 derives the channel measurement for calculating the CQI, based only on the CSI-RS. Specifically, in a transmission mode not configured with the CSI-RS, the terminal device 1 derives the channel measurement for calculating the CQI, based on the CRS. The RS used for the channel measurement for calculating the CSI is also referred to as a first RS.

Here, the terminal device 1 performs (derives) interference measurement for calculating the CQI, based on CSI-IM or a second RS, in a case that this is configured by the higher layer. Specifically, in a transmission mode configured with the CSI-IM, the terminal device 1 derives the interference measurement for calculating the CQI, based on the CSI-IM. Specifically, in the transmission mode configured with the CSI-IM, the terminal device 1 derives the interference measurement for calculating the value of the CQI corresponding to the CSI process, based only on the CSI-IM resource associated with the CSI process. The RS or IM used for the channel measurement for calculating the CSI is also referred to as a second RS.

Note that the terminal device 1 may perform (may derive) the interference measurement for calculating the CQI, based on the CRS. For example, the terminal device 1 may derive the interference measurement for calculating the CQI, based on the CRS, in a case that the CSI-IM is not configured.

Note that the channel and/or interference used to calculate the CQI may similarly be used as a channel and/or interference for calculating the PMI or RI.

Details of the LAA cell will be described below.

The frequency used by the LAA cell is shared with other communication systems and/or other LTE operators. To share the frequency, the LAA cell needs fairness with the other communication systems and/or the other LTE operators. For example, a communication method used by the LAA cell needs a fair frequency sharing technique (method). In other words, the LAA cell is a cell which performs a communication method (communication procedure) to which the fair frequency sharing technique is applicable (used).

An example of the fair frequency sharing technique is Listen-Before-Talk (LBT). Before a certain base station or a certain terminal transmits a signal by using a frequency (a component carrier, a carrier, a cell, a channel, or a medium), LBT measures (detects) interference power (an interference signal, receive power, a receive signal, noise power and a noise signal) or the like of the frequency, to identify (detect, assume or determine) whether the frequency is in an idle state (a free state, a non-congested state, Absence or Clear) or a busy state (an occupied state, a congested state, Presence or Occupied). In a case that the frequency being in the idle state is identified based on LBT, the LAA cell can transmit a signal at a prescribed timing of the frequency. In a case that the frequency is identified as the busy state, the LAA cell does not transmit a signal at the prescribed timing of the frequency. LBT controls and prevents an interference with signals to be transmitted by other communication systems and/or other base stations including other LTE operators and/or terminals. Note that LBT performed by the base station device before a downlink transmission is referred to as downlink LBT and that LBT performed by the terminal device before an uplink transmission is referred to as uplink LBT. Furthermore, LBT performed by the terminal device for sidelink transmissions may be referred to as sidelink LBT.

An LBT procedure is defined as a mechanism to which Clear Channel Assessment (CCA) check is applied before a certain base station or terminal uses the frequency (channel). The CCA performs power detection or signal detection for determining presence of absence of another signal in the channel to identify whether the frequency is in the idle state or the busy state. Note that in the present embodiment, a definition of CCA may be equivalent to a definition of LBT. Note that, in the present embodiment, CCA is also referred to as carrier sense.

CCA can use various methods as a method for determining the presence or absence of another signal. For example, CCA makes the determination based on whether the interference power at a certain frequency exceeds a certain threshold. Moreover, for example, CCA makes the determination based on whether the receive power of a prescribed signal or channel at a certain frequency exceeds a certain threshold. The threshold may be defined in advance. The threshold may be configured by a base station or another terminal. The threshold may be determined (configured) based on at least another value (parameter) such as transmit power (maximum transmit power). Moreover, for example, CCA makes the determination, based on whether a prescribed channel at a certain frequency has been decoded.

The LBT procedure includes Initial CCA (ICCA, single sensing, LBT category 2, Frame-Based Equipment (FBE)) allowing a signal to be transmitted after a CCA check is performed once, and Extended CCA (ECCA, multiple sensing, LBT category 3/4, Load-Based Equipment (LBE)) allowing a signal to be transmitted after the CCA check is performed a prescribed number of times. A period in which the CCA check is performed by ICCA is referred to as an ICCA period or an ICCA slot length, and lasts, for example, 34 microseconds. Furthermore, a period in which the CCA check is performed by ECCA is referred to as an ECCA period or an ECCA slot length, and lasts, for example, 9 microseconds. Note that the prescribed number of times is also referred to as a backoff counter (counter, random number counter, ECCA counter). Furthermore, a period in which the CCA check is performed after the frequency changes from the busy state to the idle state is referred to as a defer period or an ECCA defer period, and lasts, for example, 34 microseconds.

Figure 6:
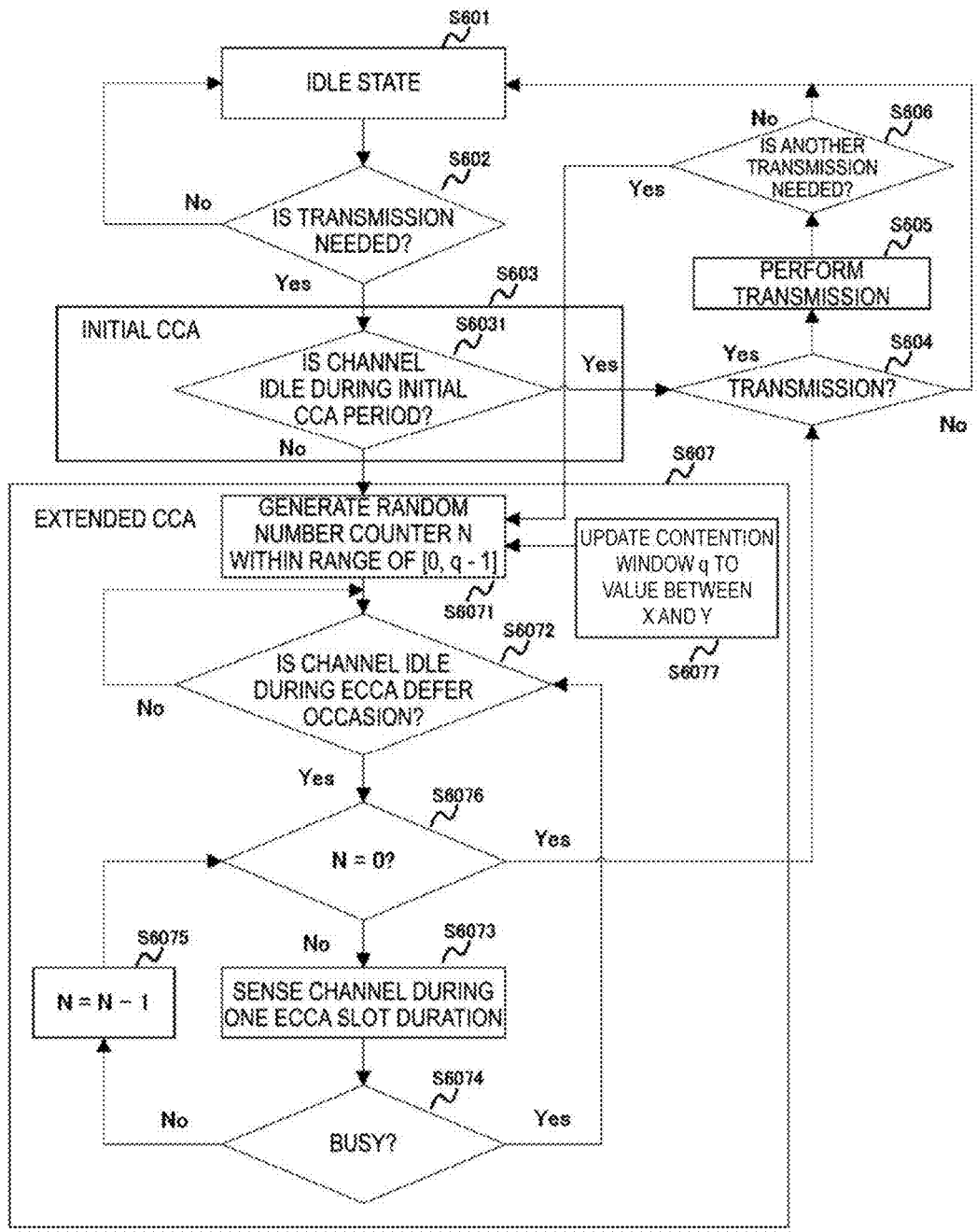
FIG. 6 is a diagram illustrating an example of a procedure of CCA for a downlink transmission according to a present embodiment.

FIG. 6 illustrates an example of an LBT (LBT category 4, LBE) procedure for a downlink transmission. In a case that the need arises to transmit, to the terminal device, certain information (data, a buffer, load, traffic) in the downlink while the channel is in the idle state (S601) of waiting for a downlink transmission, the base station device determines whether the transmission is needed (S602) and proceeds to initial CCA (S603). In the initial CCA, the base station device performs the CCA check during an initial CCA period to sense whether the channel is idle or busy (S6031). In a case of determining that the channel is idle as a result of the initial CCA (S603), the base station device acquires the right to access the channel and proceeds to a transmission operation. Then, the base station device determines whether to actually perform a downlink transmission at that timing (S604), and in a case of determining to perform the downlink transmission, the base station device performs the downlink transmission (S605). After performing the downlink transmission, the base station device determines whether any information that needs another downlink transmission is still present (remains) (S606). In a case that no information that needs another downlink transmission has been generated yet (remains), the channel returns to the idle state (S601). On the other hand, in a case that the initial CCA (S603) results in the determination that the channel is busy or that the determination of whether any information that needs another downlink transmission is still present (remains)(S606) results in the determination that information that needs another downlink transmission is still present (remains), the base station device proceeds to the extended CCA (S607). In the extended CCA, first, the base station device randomly generates a counter value N within the range from 0 to q−1 (S6071). The base station device then senses whether the channel is idle or busy in the ECCA defer occasion (S6072). In a case of determining that the channel is busy in the ECCA defer occasion, the base station device senses again whether the channel is idle or busy in the ECCA defer occasion (6072). On the other hand, in a case of determining that the channel is idle in the ECCA defer occasion, then the base station device senses the channel (medium) during one ECCA slot duration (S6073) to determine whether the channel is idle or busy (6074). The base station device decrements the counter value N by one (S6075) in a case of determining that the channel is idle, and returns to the process of sensing the channel in the ECCA defer occasion (S6072) again in a case of determining that the channel is busy. The base station device then determines whether the counter value is 0 (S6076), and in a case that the counter value is 0, proceeds to a transmission process (S604, S605). On the other hand, in a case that the counter value is not 0, the base station device senses the channel (medium) during one ECCA slot duration again (S6073). Note that, in a case that the counter value N is generated, a value in a contention window q is updated to a value between X and Y according to a channel state (S6077).

The value in the contention window q is determined, for example, based on the HARQ-ACK response in the PDSCH transmitted by the base station device, a power value obtained by sensing of the channel by the base station device, reporting of RSRP, RSRQ, and/or RSSI, or the like. The value in the contention window q is, by way of example, exponentially increased. Furthermore, the maximum value X and the minimum value Y used to determine the value in the contention window q are parameters configured by the higher layer.

In the LBT procedure in FIG. 6, the extended CCA may not be performed. Specifically, in a case of determining that the channel is busy as a result of the initial CCA (S603), the base station device may return to the idle state (S601) instead of proceeding to the extended CCA process (S607). Furthermore, even in a case that, after a downlink transmission, information that needs another downlink transmission is still present (S606), the base station device may return to the idle state (S601) instead of proceeding to the extended CCA process (S607). LBT involving such a process is also referred to as LBT category 2. LBT involving such a process may be applied as LBT for a DS transmission, a PDSCH transmission with a time length of 1 ms or shorter, or a transmission only of the PDCCH, for example.

Note that CCA in the LAA cell does not need to be recognized by the terminal connected with (configured to) the LAA cell.

In a case that the terminal device 1 can detect a transmission after CCA is completed in the LAA cell, the terminal device 1 may assume that consecutive transmissions are performed for several subframes after detection of the first transmission. Several subframes for consecutive transmissions are also referred to as a transmission burst. In particular, several subframes for consecutive PDSCH transmissions are referred to as a PDSCH transmission burst. The PDSCH transmission burst may include a channel other than the PDSCH and/or a signal. For example, the PDSCH transmission burst may include the PDSCH and the DS and be transmitted. Moreover, in particular, several subframes for which only the DS is transmitted are referred to as a DS transmission burst. The number of subframes for consecutive transmissions through the transmission burst may be configured for the terminal device 1 by using an RRC message. In the present embodiment, the transmission burst of the downlink signal or channel is also referred to as a downlink transmission, and the transmission burst of the uplink signal or channel is also referred to as an uplink transmission.

In a case of detecting a reservation signal included in the beginning of the transmission burst, the terminal device can sense the transmission burst. The terminal device regards several subframes following the subframe in which the reservation signal has been detected, as a transmission burst. In a case that a first synchronization signal, a second synchronization signal, or a third synchronization signal described below is detected, instead of the reservation signal, the terminal device can determine the following several subframes as a transmission burst.

Furthermore, the terminal device can sense a transmission burst in a case of decoding information included in the DCI and relating to a subframe indicating a transmission burst. The DCI is included in the PDCCH or EPDCCH allocated in the CSS for notification. Alternatively, the DCI may be included in the PDCCH or EPDCCH allocated in the USS for notification.

The LAA cell may be defined as a cell different from a secondary cell which uses the allocated frequency. For example, the LAA cell is configured differently from the configuration of the secondary cell which uses the allocated frequency. Part of parameters configured to the LAA cell is not configured to the secondary cell which uses the allocated frequency. Part of the parameters configured to the secondary cell which uses the allocated frequency is not configured to the LAA cell. In the present embodiment, the LAA cell is described as a cell different from the primary cell and the secondary cell(s), but the LAA cell may be defined as one of the secondary cells. Secondary cells of the related art are also referred to as "first secondary cells", and the LAA cell is also referred to as "second secondary cell". A primary cell and secondary cell(s) of the related art are also referred to as "first serving cells", and the LAA cell is also referred to as "second serving cell".

The LAA cell may be different from a frame structure type of the related art. For example, a first frame structure type (FDD, frame structure type 1) or a second frame structure type (TDD, frame structure type 2) are used for (configured to) the serving cells in the related art, and a third frame structure type (frame structure type 3) is used for (configured to) the LAA cell. Note that either an LAA cell of the first frame structure type or an LAA cell of the second frame structure type may be used (may be configured).

Moreover, the third frame structure type may be preferably a frame structure type corresponding to a TDD cell that can perform transmissions at the same frequency both in the uplink and in the downlink while having characteristics of an FDD cell. For example, the third frame structure type may have uplink subframes, downlink subframes, and special subframes but may be similar to the FDD cell in terms of an interval from reception of the uplink grant until a transmission of the PUSCH scheduled in the uplink grant or an interval from reception of the PDSCH to HARQ feedback to the PDSCH.

Furthermore, the third frame structure type may be preferably a frame structure type independent of a conventional TDD UpLink/DownLink (TDD UL/DL) configuration. For example, the uplink subframes, the downlink subframes, and the special subframes may be aperiodically configured for the radio frame. For example, the uplink subframes, the downlink subframes, and the special subframes may be determined based on the PDCCH or the EPDCCH.

Here, the non-allocated frequency is a frequency different from the allocated frequency that is allocated as a dedicated frequency to a prescribed operator. For example, the non-allocated frequency is a frequency used by a wireless LAN. For example, the non-allocated frequency is a frequency which is not configured to the LTE in the related art, and the allocated frequency is a frequency which can be configured by the LTE in the related art. In the present embodiment, the frequency configured to the LAA cell is described as the non-allocated frequency, but is not limited to this. In other words, the non-allocated frequency can be replaced with a frequency configured to the LAA cell. For example, the non-allocated frequency is a frequency which cannot be configured to the primary cell, and is a frequency which can be configured only to the secondary cell(s). For example, the non-allocated frequency includes a frequency shared with multiple operators. For example, the non-allocated frequency is a frequency which is configured only to a cell configured, assumed and/or processed differently from the primary cell or secondary cell(s) of the related art.

The LAA cell may be a cell which uses a different method from the method of the related art for structures of radio frames, physical signals and/or physical channels according to LTE, and a communication procedure.

For example, in the LAA cell, prescribed signals and/or channels configured (transmitted) by the primary cell and/or the secondary cell(s) are not configured (transmitted). The prescribed signals and/or channels include the CRS, the DS, the PDCCH, the EPDCCH, the PDSCH, the PSS, the SSS, the PBCH, a PHICH, a PCFICH, the CSI-RS and/or an SIB, or the like. For example, the signals and/or the channels that are not configured in the LAA cell are as follows. In addition, the signals and/or the channels described below may be used in combination. Note that in the present embodiment, the signals and/or the channels that are not configured in the LAA cell may also be read as signals and/or channels whose the transmissions from the LAA cell are not expected by the terminal.

(1) In the LAA cell, control information of a physical layer is not transmitted on the PDCCH, but is transmitted only on the EPDCCH.

(2) In the LAA cell, the CRS, the DMRS, the URS, the PDCCH, the EPDCCH and/or the PDSCH are not transmitted in subframes which are activated (on-state) or all subframes, and the terminal does not assume this transmission in all subframes.

(3) In the LAA cell, the terminal assumes transmission of the DSs, the PSSs and/or the SSSs in subframes which are activated (on-state).

(4) In the LAA cell, information of CRS mapping is announced to the terminal for each subframe, and the terminal assumes the CRS mapping based on the information. For example, according to the assumption of the CRS mapping, the CRS is not mapped onto all resource elements of the corresponding subframe. According to the assumption of the CRS mapping, the CRS is not mapped onto part of resource elements (e.g., all resource elements in two head OFDM symbols) of the corresponding subframe. According to the assumption of the CRS mapping, the CRSs are mapped onto all resource elements of the corresponding subframe. For example, the information of the CRS mapping is announced from the corresponding LAA cell or a cell different from the corresponding LAA cell. The information of the CRS mapping is included in the DCI and is announced on the PDCCH or the EPDCCH.

For example, in the LAA cell, the prescribed signals and/or channels which is not configured (transmitted) by the primary cell and/or the secondary cell(s) is configured (transmitted).

For example, in the LAA cell, only downlink component carrier or subframe is defined, and only downlink signal and/or channel are transmitted. In other words, in the LAA cell, uplink component carrier or subframe is not defined, and uplink signal and/or channel is not transmitted.

For example, in the LAA cell, a Downlink Control Information (DCI) format which can be supported is different from a DCI format which can support the primary cell and/or the secondary cell(s). The DCI format which supports only the LAA cell is defined. The DCI format which supports the LAA cell includes control information which is only valid for the LAA cell.

The terminal device can recognize the LAA cell, based on a parameter provided by the higher layer. For example, the terminal device can recognize a conventional cell (band) or the LAA cell (LAA band), based on a parameter indicative of the center frequency of the component carrier. In this case, information about the center frequency is associated with the type of the cell (band).

For example, in the LAA cell, the assumption of the signals and/or channels is different from the secondary cells in the related art.

First, the assumption of the signals and/or channels in the secondary cells of the related art will be described. A terminal that satisfies part or all of the following conditions assumes that the PSS, the SSS, the PBCH, the CRS, the PCFICH, the PDSCH, the PDCCH, the EPDCCH, the PHICH, the DMRS and/or the CSI-RS may not be transmitted by the secondary cell except transmission of the DS. The terminal assumes that the DS is always transmitted by the secondary cell. The assumption continues to a subframe in which an activation command (a command for activation) is received by the terminal in the secondary cell at a certain carrier frequency.

(1) The terminal supports a configuration (parameter) associated with the DS.

(2) RRM measurements based on the DS is configured to the terminal in the secondary cell.

(3) The secondary cell is deactivated (deactivated state).

(4) Reception of the MBMS by a higher layer is not configured to the terminal in the secondary cell.

Furthermore, in a case that the secondary cell is activated (activated state), the terminal assumes that the PSS, the SSS, the PBCH, the CRS, the PCFICH, the PDSCH, the PDCCH, the EPDCCH, the PHICH, the DMRS and/or the CSI-RS are transmitted by the secondary cell in a configured prescribed subframe or all subframes.

Next, an example of the assumption of the signals and/or channels in the LAA cell will be described. A terminal that satisfies part or all of the following conditions assumes that the PSS, the SSS, the PBCH, the CRS, the PCFICH, the PDSCH, the PDCCH, the EPDCCH, the PHICH, the DMRS and/or the CSI-RS may not be transmitted together with transmission of the DS by the LAA cell. The assumption continues to a subframe in which an activation command (a command for activation) is received by the terminal in the secondary cell at a certain carrier frequency.

(1) The terminal supports a configuration (parameter) associated with the DS.

(2) RRM measurements based on the DS is configured to the terminal in the LAA cell.

(3) The LAA cell is deactivated (deactivated state).

(4) Reception of the MBMS by a higher layer is not configured to the terminal in the LAA cell.

Furthermore, another example of the assumption of the signals and/or channels in the LAA cell will be described. In a case that the LAA cell is deactivated (deactivated state), the assumption of the signals and/or channels in the LAA cell is the same as the assumption of the signals and/or channels in the secondary cells in the related art. In a case that the LAA cell is activated (activated state), the assumption of the signals and/or channels in the LAA cell is different from the assumption of the signals and/or channels in the secondary cells in the related art. In a case that, for example, the LAA cell is activated (activated state), the terminal assumes that the LAA cell may not transmit the PSS, the SSS, the PBCH, the CRS, the PCFICH, the PDSCH, the PDCCH, the EPDCCH, the PHICH, the DMRS and/or the CSI-RS except a prescribed subframe configured to the LAA cell. Details will be described below.

Furthermore, the description has been given of a case that CCA is performed on one subframe, but a time (period) for performing CCA is not limited to this. The period for performing CCA may vary per LAA cell, per CCA timing, or per execution of CCA. For example, CCA is performed at a time based on a prescribed time slot (a time interval or a time domain). This prescribed time slot may be defined or configured based on a time obtained by dividing one subframe by the prescribed number. The prescribed time slot may be determined or configured by the prescribed number of subframes.

Furthermore, in the present embodiment, a field size in the time domain such as a time (time slot) for performing CCA or a time in which the channel and/or signal are transmitted (can be transmitted) in a certain subframe can be expressed by using a prescribed time unit. For example, the field size in the time domain is expressed by some time units Ts. Ts is $1/(15000 \times 2048)$ seconds. For example, one subframe time is $30720 \times Ts$ (one millisecond). For example, one ICCA slot length or defer period is $1044 \times Ts$ (approximately 33.98 microseconds) or $1045 \times Ts$ (approximately 34.02 microseconds). For example, one ECCA slot length is $276 \times Ts$ (approximately 8.984 microseconds) or $277 \times Ts$ (approximately 9.017 microseconds). For example, one ECCA slot length is $307 \times Ts$ (approximately 9.993 microseconds) or $308 \times Ts$ (approximately 10.03 microseconds).

Furthermore, whether the LAA cell can transmit the channel and/or signal (including the reservation signal) from an intermediate symbol in a certain subframe may be configured for the terminal or the LAA cell. For example, information indicating whether such transmission is possible in the configuration on the LAA cell is configured to the terminal by the RRC signaling. The terminal switches processing associated with reception (monitoring, recognition and decoding) at the LAA cell based on the information.

Furthermore, subframes in which symbols can be transmitted from an intermediate symbol (also including subframes in which symbols up to the intermediate symbol can be transmitted) may be all subframes in LAA cell. Furthermore, subframes in which symbols can be transmitted from the intermediate symbol may be subframes defined in advance for the LAA cell or configured subframes.

Furthermore, subframes in which symbols can be transmitted from the intermediate symbol (also including subframes in which symbols up to the intermediate symbol can be transmitted) can be configured, announced or determined based on an uplink/downlink configuration (UL/DL configuration) according to TDD. For example, such subframes are subframes announced (designated) as special subframes by the UL/DL configuration. Each of the special subframes in the LAA cell is a subframe including at least one of the three fields, a Downlink Pilot Time Slot (DwPTS), a Guard Period (GP), and an Uplink Pilot Time Slot (UpPTS). The configuration on the special subframe in the LAA cell may be configured or announced by the RRC signaling or PDCCH or EPDCCH signaling. This configuration configures a length in time of at least one of the DwPTS, the GP and the UpPTS. Furthermore, this configuration is index information indicating candidates of the predetermined length in time. Furthermore, for this configuration, the same length in time as the DwPTS, the GP and the UpPTS used for the special subframe configuration configured to the TDD cells in the related art can be used. In other words, the length in time in which transmission is possible in a certain subframe is determined based on one of the DwPTS, the GP and the UpPTS.

Further, in the present embodiment, the reservation signal may be a signal that can be received by a LAA cell different from the LAA cell that transmits the reservation signal. For example, the LAA cell different from the LAA cell that transmits the reservation signal is the LAA cell (neighboring LAA cell) neighboring to the LAA cell that transmits the reservation signal. For example, the reservation signal includes information of a transmission state (use state) of a prescribed subframe and/or symbol in the LAA cell. In a case that the LAA cell different from the LAA cell that transmits a certain reservation signal receives the reservation signal, the LAA cell having received the reservation signal recognizes the transmission state of the prescribed subframe and/or symbol, based on the reservation signal, and performs scheduling according to the state.

Furthermore, the LAA cell having received the reservation signal may perform LBT before transmitting a channel and/or signal. This LTB is performed based on the received reservation signal. For example, during this LBT, the channels and/or the signals transmitted (assumed to be transmitted) from the LAA cell having transmitted the reservation signal are taken into consideration, scheduling including resource allocation and MCS selection is performed.

Furthermore, in a case that the LAA cell having received the reservation signal performs scheduling of transmitting the channels and/or signals based on the reservation signal, it is possible to announce information of such scheduling to one or more LAA cells including the LAA cell having transmitted this reservation signal according to a prescribed method. For example, the prescribed method is a method for transmitting the prescribed channel and/or signal including the reservation signal. Furthermore, for example, the prescribed method is a method for performing announcement via a backhaul such as an X2 interface.

Furthermore, according to carrier aggregation and/or dual connectivity, a terminal of the related art can configure up to five serving cells. However, the terminal according to the present embodiment can extend a maximum number of serving cells that can be configured. In other words, the terminal according to the present embodiment can configure more than five serving cells. For example, the terminal according to the present embodiment can configure up to 16 or 32 serving cells. For example, the more than five serving cells configured by the terminal according to the present embodiment include the LAA cell. Furthermore, all of the more than five serving cells configured by the terminal according to the present embodiment may be the LAA cell.

Furthermore, in a case that the more than five serving cells can be configured, a configuration on part of the serving cells may be different from the configuration of the serving cells in the related art (i.e., the secondary cell(s) in the related art). For example, differences of this configuration are as follows. The configurations described below may be used in combination.

(1) To the terminal, up to five serving cells in the related art are configured, and up to 11 or 27 serving cells different from serving cells in the related art are configured. In other words, to the terminal, in addition to a primary cell of the related art, up to four secondary cells of the related art are configured, and up to 11 or 27 secondary cells different from the secondary cells of the related art are configured.

(2) The configuration on the serving cells (secondary cells) different from the serving cells of the related art includes configurations on an LAA cell. For example, to the terminal, in addition to the primary cell in the related art, up to four secondary cells that do not include the configuration on the LAA cell are configured, and up to 11 or 27 secondary cells different from the secondary cells in the related art are configured.

Furthermore, in a case that the more than five serving cells can be configured, the base station (including the LAA cell) and/or the terminal can perform different processing or assumption compared to the case that up to five serving cells are configured. For example, differences of the processing and assumption are as follows. The processing or the assumption described below may be used in combination.

(1) Even in the case that the more than five serving cells are configured, the terminal assumes that the PDCCH, the EPDCCH and/or the PDSCH are simultaneously transmitted (received) from the five serving cells at maximum. Consequently, the terminal can use the same method as the method of the related art, for reception of the PDCCH, the EPDCCH and/or the PDSCH and transmission of HARQ-ACK for the PDSCH.

(2) In the case that the more than five serving cells are configured, a combination (group) of cells for bundling of HARQ-ACKs for the PDSCHs in these serving cells are configured to the terminal. For example, all serving cells, all secondary cells, all LAA cells or all secondary cells different from the secondary cells in the related art include information (configuration) on bundling of HARQ-ACKs between the serving cells. For example, the information of the bundling of HARQ-ACKs between the serving cells is an identifier (an index or an ID) for performing the bundling. For example, the bundling is performed on the HARQ-ACKs over cells having the same identifier to be bundled. This bundling is performed according to a logical AND operation for the target HARQ-ACKs. Furthermore, the maximum number of identifiers to be bundled can be five. Furthermore, the maximum number of identifiers to be bundled can be five including the number of cells that does not perform bundling. In other words, the number of groups to perform bundling over the serving cells can be five at maximum. Consequently, the terminal can use the same method as the method of the related art, for reception of the PDCCH, the EPDCCH and/or the PDSCH and transmission of HARQ-ACK for the PDSCH.

(3) In the case that the more than five serving cells are configured, a combination (group) of cells for multiplexing of HARQ-AC Ks for the PDSCHs in these serving cells are configured to the terminal. In the case that the combination (group) of the cells for multiplexing of the HARQ-ACKs for the PDSCHs is configured, the multiplexed HARQ-ACKs are transmitted on the PUCCH or the PUSCH based on the group. The maximum number of serving cells to be multiplexed is defined or configured for each group. The maximum number is defined or configured based on the maximum number of serving cells configured to the terminal. For example, the maximum number is the same as the maximum number of serving cells configured to the terminal, or half the maximum number of serving cells configured to the terminal. Furthermore, the maximum number of PUCCHs to be simultaneously transmitted is defined or configured based on the maximum number of serving cells to be multiplexed in each group and the maximum number of serving cells configured to the terminal.

In other words, the number of configured first serving cells (i.e., the primary cell and/or the secondary cell(s)) is a prescribed number (i.e., five) or less. A total of the configured first serving cells and second serving cell (i.e., LAA cell) exceeds the prescribed number.

Next, terminal capability associated with LAA will be described. The terminal announces (transmits) information (terminal capability) on capability of the terminal to the base station by the RRC signaling, based on a command from the base station. The terminal capability of a certain function (feature) is announced (transmitted) in a case that the function (feature) is supported, and is not announced (transmitted) in a case that the function (feature) is not supported. Furthermore, the terminal capability of the certain function (feature) may be information indicating whether testing and/or mounting this function (feature) has been finished. For example, the terminal capability according to the present embodiment is as follows. The terminal capability described below may be used in combination.

(1) The terminal capability associated with support of the LAA cell, and the terminal capability associated with support of a configuration of more than five serving cells are independently defined. For example, the terminal that supports the LAA cell supports the configuration of the more than five serving cells. In other words, the terminal that does not support the configuration of the more than five serving cells does not support the LAA cell. In this case, the terminal that supports the configuration of the more than five serving cells may or may not support the LAA cell.

(2) The terminal capability associated with support of the LAA cell, and the terminal capability associated with support of a configuration of more than five serving cells are independently defined. For example, the terminal that supports the configuration of the more than five serving cells supports the LAA cell. In other words, the terminal that does not support the LAA cell does not support the configuration of the more than five serving cells. In this case, the terminal that supports the LAA cell may or may not support the configuration of the more than five serving cells.

(3) The terminal capability associated with downlink in the LAA cell, and the terminal capability associated with uplink in the LAA cell are independently defined. For example, the terminal that supports the uplink in the LAA cell supports the downlink in the LAA cell. In other words, the terminal that does not support the downlink in the LAA cell does not support the uplink in the LAA cell. In this case, the terminal that supports the downlink in the LAA cell may or may not support the uplink in the LAA cell.

(4) The terminal capability associated with support of the LAA cell includes support of a transmission mode configured only to the LAA cell.

(5) The terminal capability associated with the downlink according to the configuration of the more than five serving cells, and the terminal capability associated with the uplink according to the configuration of the more than five serving cells serving cells are independently defined. For example, the terminal that supports the uplink according to the configuration of the more than five serving cells supports the downlink according to the configuration of the more than five serving cells. In other words, the terminal that does not support the downlink according to the configuration of the more than five serving cells does not support the uplink according to the configuration of the more than five serving cells. In this case, the terminal that supports the downlink according to the configuration of the more than five serving cells may or may not support the uplink according to the configuration of the more than five serving cells.

(6) Regarding the terminal capability according to the configuration of the more than five serving cells, terminal capability that supports a configuration of 16 downlink serving cells (component carriers) at maximum, and terminal capability that supports a configuration of 32 downlink serving cells at maximum are independently defined. Furthermore, the terminal that supports the configuration of 16 downlink serving cells at maximum supports the configuration of at least one uplink serving cell. The terminal that supports the configuration of 32 downlink serving cells at maximum supports the configuration of at least two uplink serving cells. That is, the terminal that supports the configuration of 16 downlink serving cells at maximum may not support the configuration of two or more uplink serving cells.

(7) The terminal capability associated with the support of the LAA cell is announced based on a frequency (band) used by the LAA cell. In a case that, for example, the terminal announces a supported frequency or a frequency combination, and the announced frequency or frequency combination includes at least one frequency used by the LAA cell, the terminal implicitly announces that this terminal supports the LAA cell. In other words, in a case that the announced frequency or frequency combination does not include the frequency used by the LAA cell at all, the terminal implicitly announces that this terminal does not support the LAA cell.

Furthermore, the present embodiment has described a case where the LAA cell transmits the PDCCH or the EPDCCH for announcing the DCI for the PDSCH transmitted from this LAA cell (i.e., a case of self scheduling), but is not limited to this. The method described in the present embodiment is applicable also in a case that, for example, a serving cell different from the LAA cell transmits the PDCCH or the EPDCCH for announcing the DCI for the PDSCH transmitted from the LAA cell (i.e., a case of cross carrier scheduling).

Furthermore, in the present embodiment, the information for recognizing the symbols in which the channels and/or signals are transmitted may be based on the symbols in which the channels and/or signals are not transmitted. For example, this information is information indicating the last symbol of the symbols in which the channels and/or signals are not transmitted. Furthermore, the information for recognizing the symbols in which the channels and/or signals are transmitted may be determined based on other information or parameters.

Furthermore, in the present embodiment, the symbols in which the channels and/or signals are transmitted may be independently configured (announced or defined) to the channels and/or signals. In other words, the information for recognizing the symbols in which the channels and/or signals are transmitted, and the announcement method of the information can be independently configured (announced or defined) to the channels and/or signals. For example, the information for recognizing the symbols in which the channels and/or signals are transmitted, and the announcement method of the information may be independently configured (announced or defined) for the PDSCH and the EPDCCH.

Furthermore, in the present embodiment, symbols/subframes in which the channels and/or signals are not transmitted (cannot be transmitted) may be symbols/subframes in which the channels and/or signals are not assumed to be transmitted (be able to be transmitted) from a viewpoint of the terminal. That is, the terminal can regard that the LAA cell does not transmit the channels and/or signals in the symbols/subframes.

Furthermore, in the present embodiment, the symbols/subframes in which the channels and/or signals are transmitted (can be transmitted) may be symbols/subframes in which the channels and/or signals may be assumed to be transmitted from the viewpoint of the terminal. In other words, the terminal can regard that the LAA cell may or may not transmit the channels and/or signals in the symbols/subframes.

Furthermore, in the present embodiment, the symbols/subframes in which the channels and/or signals are transmitted (can be transmitted) may be symbols/subframes in which the channels and/or signals are assumed to be surely transmitted from the viewpoint of the terminal. That is, the terminal can regard that the LAA cell surely transmits the channels and/or signals in the symbols/subframes.

Next, an example of a configuration of a downlink reference signal in the LAA cell will be described.

Figure 5:
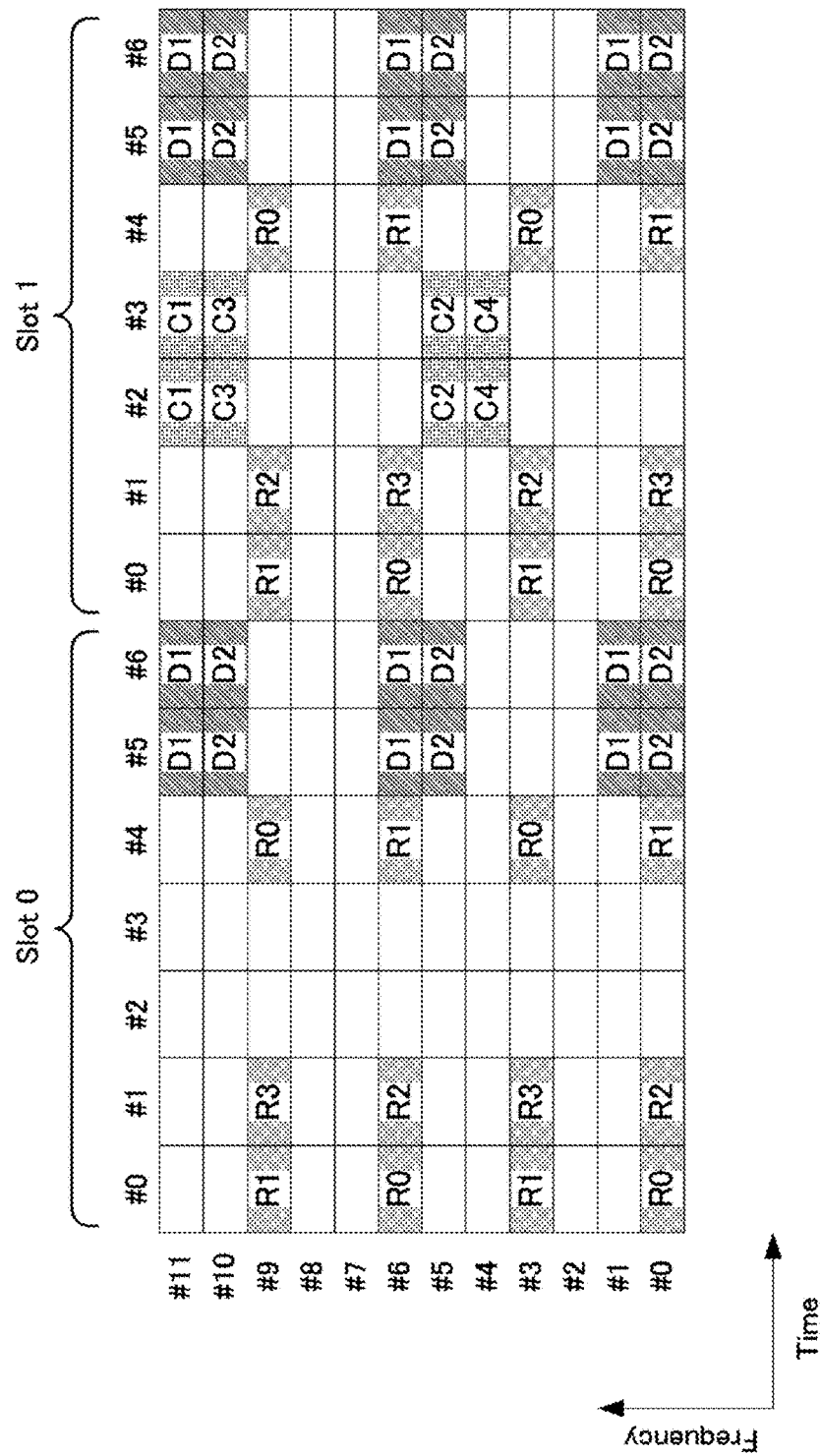
FIG. 5 is a diagram illustrating an example of a downlink signal configuration according to the present embodiment.

FIG. 5 is a diagram illustrating an example of the configuration of the downlink reference signal. By way of example, the CRSs can be mapped to REs R0 to R3. R0 denotes examples of the REs on which the CRS of antenna port 0 is mapped, R1 denotes examples of the REs on which the CRS of antenna port 1 is mapped, R2 denotes examples of the REs on which the CRS of antenna port 2 is mapped, and R3 denotes examples of the REs on which the CRS of antenna port 3 is mapped. Note that the CRSs may be shifted, for mapping, in the frequency direction according to a parameter associated with the cell identity. Specifically, an index k for which the RE specifies mapping is increased based on a value of $N^{cell}_{ID}$ mod 6. Here, $N^{cell}_{ID}$ denotes the value of the physical cell identity. The DMRSs can be mapped to REs D1 and D2. D1 denotes examples of the REs on which the DMRSs of antenna ports 7, 8, 11, 13 are mapped, and D2 denotes examples of the REs on which the DMRSs of antenna ports 9, 10, 12, 14 are mapped. The CSI-RSs can be mapped to REs C1 to C4. C0 denotes examples of the REs on which the CSI-RSs of antenna ports 15, 16 are mapped, C1 denotes examples of the REs on which the CSI-RSs of antenna ports 17, 18 are mapped, C2 denotes examples of the REs on which the CSI-RSs of antenna ports 19, 20 are mapped, and C3 denotes examples of the REs on which the CSI-RSs of antenna ports 21, 22 are mapped. Note that the CSI-RS may be mapped to the RE at OFDM symbol #5 or #6 in slot 0 and to the RE at OFDM symbol #1, #2, or #3 in slot 1. The REs on which the CSI-RS is mapped are indicated based on a parameter provided by the higher layer.

Next, the relationship between a downlink transmission, an uplink transmission, and LBT will be described.

Figure 7:
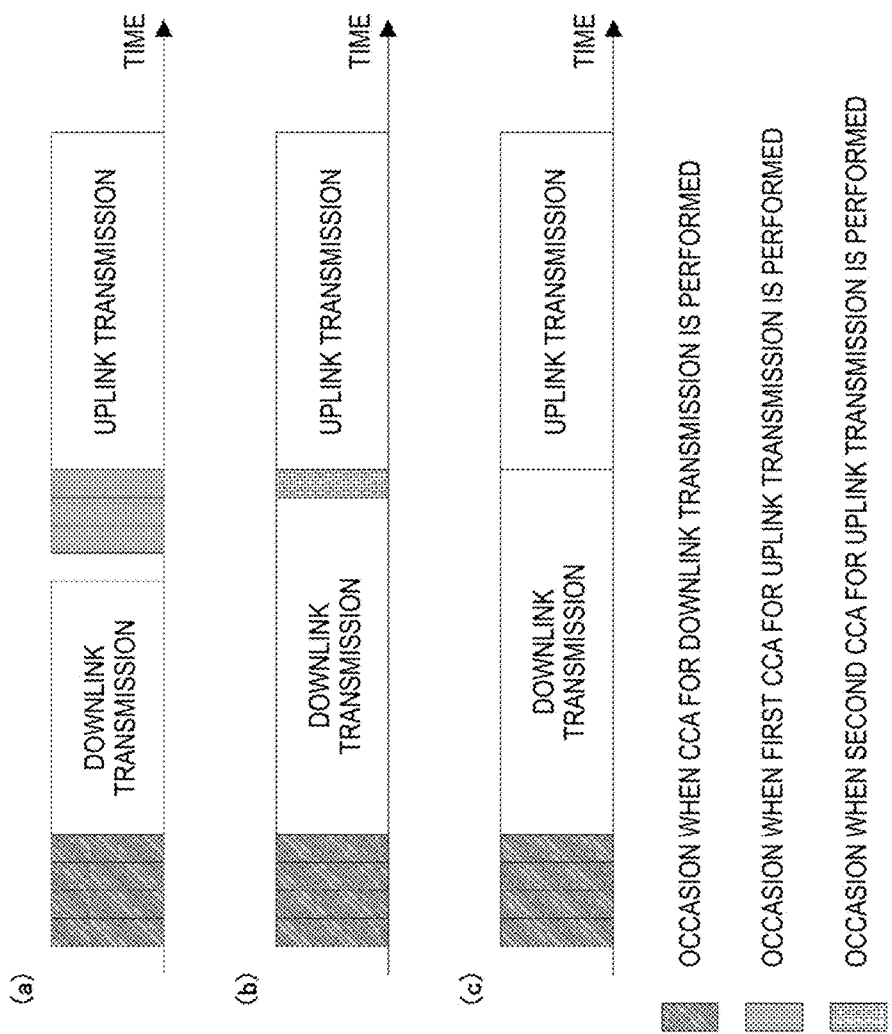
FIG. 7 is a diagram illustrating an example of a relationship between an interval, between a downlink transmission and an uplink transmission, and types of CCA according to the present embodiment.

FIG. 7 illustrates an example of the relationship between the interval between a downlink transmission and an uplink transmission and types of LBT on the time axis according to the present embodiment. In (a) of FIG. 7, a case where the downlink transmission and the uplink transmission are sufficiently distant from each other on the time axis is illustrated. In the case where the downlink transmission and the uplink transmission are sufficiently distant from each other, for example, the interval between the downlink transmission and the uplink transmission is at least one subframe (1 millisecond). In such a case, there is no channel state (channel sensing result) correlation between the downlink transmission and the uplink transmission, thus leading to the need to perform LBT involving sufficient carrier sensing on each transmission. Here, LBT performed before the uplink transmission in (a) of FIG. 7 is referred to as first uplink LBT. In (b) of FIG. 7, a case where the downlink transmission and the uplink transmission are slightly distant from each other on the time axis is illustrated. In the case where the downlink transmission and the uplink transmission are slightly distant from each other, for example, the interval between the downlink transmission and the uplink transmission corresponds to several symbols (several tens of microseconds to several hundred microseconds). In such a case, CCA performed before the downlink transmission may be considered to allow the channel state (channel sensing result) to be also maintained before the uplink transmission. Thus, the terminal device may perform simplified CCA before transmitting an uplink signal. Here, LBT performed before the uplink transmission in (b) of FIG. 7 is referred to as second uplink LBT. In (c) of FIG. 7, a case where the downlink transmission and the uplink transmission are not substantially distant from each other on the time axis is illustrated. In the case where the downlink transmission and the uplink transmission are not substantially distant from each other, for example, the interval between the downlink transmission and the uplink transmission is several microseconds to several tens of microseconds, such as 34 microseconds or 40 microseconds. In such a case, a channel is reserved for the uplink transmission by the downlink transmission, and thus, the downlink transmission and the uplink transmission may be regarded as one transmission burst. Thus, the terminal device may perform an uplink transmission without performing CCA. As in these examples, the uplink signal and/or channel can be efficiently transmitted also in the LAA cell by changing the LBT procedure to be performed, according to the interval between the downlink transmission and the uplink transmission.

The uplink transmission and the downlink transmission in FIG. 7 may be interchanged with each other. In other words, downlink LBT may be omitted in a case that the uplink transmission and the downlink transmission are not substantially distant from each other on the time axis.

Details of uplink LBT will be described below.

"Before performing an uplink transmission" or "before transmitting the uplink" means before an indicated timing (subframe) for the uplink transmission.

In the first uplink LBT, the CCA check is performed multiple times using the backoff counter before the indicated timing for the uplink transmission. The terminal device attempts the CCA check the number of times equal to a value in the backoff counter. In a case that all the CCA checks result in the determination that the channel is idle, the terminal device can acquire the right to access the channel to transmit the uplink.

Figure 8:
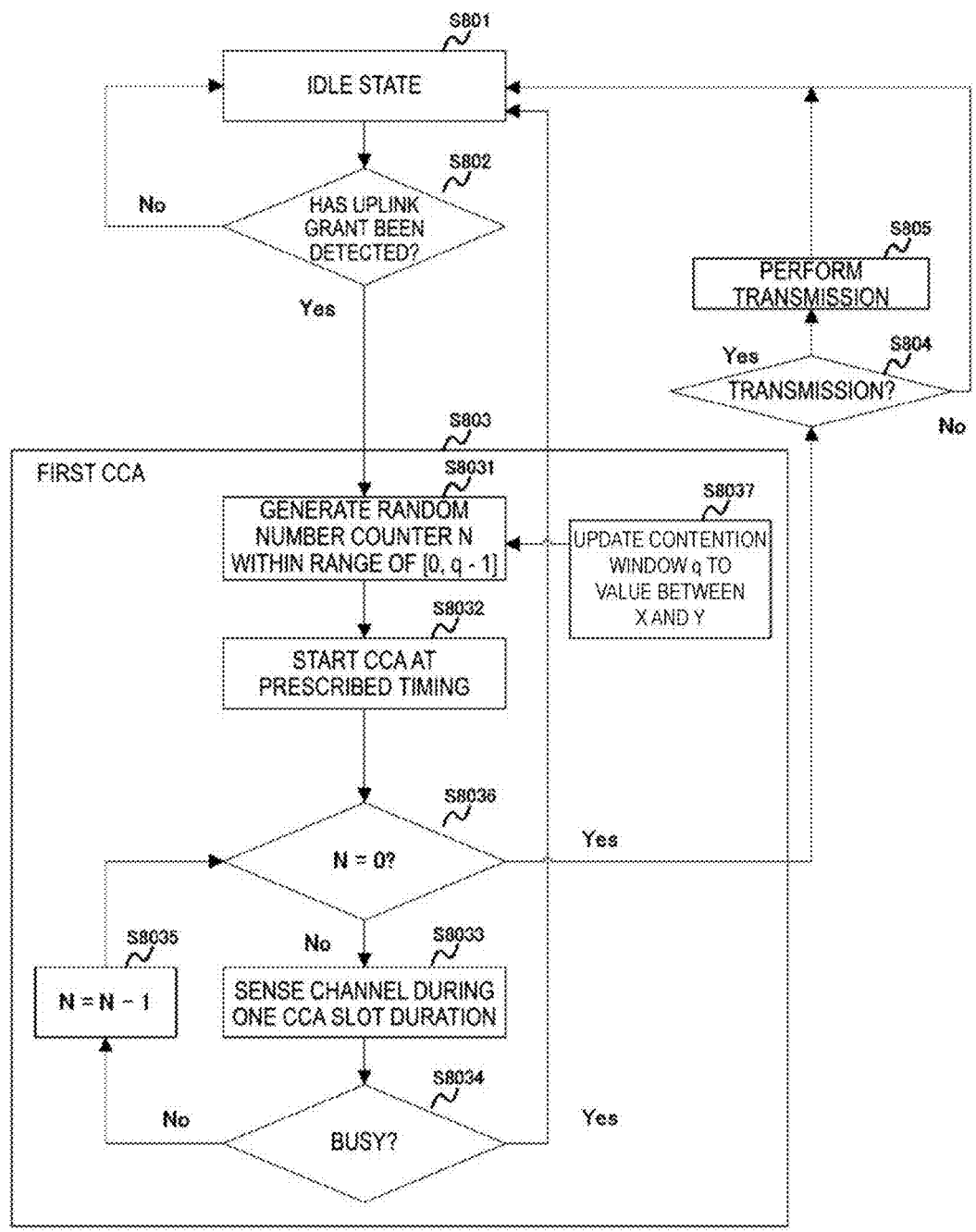
FIG. 8 is a diagram illustrating an example of a procedure of CCA for an uplink transmission according to the present embodiment.

FIG. 8 illustrates an example of a procedure of the first uplink LBT. In a case of detecting the uplink grant (S802) in the idle state (S801), the terminal device performs first CCA (S803). In the first CCA, first, the terminal device randomly generates a counter value N within the range from 0 to q−1 (S8031). Note that, in a case that a numerical value associated with the counter value N is indicated by the base station device using the uplink grant, the terminal device uses the counter value N based on the numerical value instead of generating a counter value. Note that, in a case that the counter value does not become to 0 in last LBT, with a value remaining in the counter, the terminal device may use the remaining counter value N instead of generating a counter value N. Then, the terminal device starts CCA at a prescribed timing (S8032). The terminal device senses the channel (medium) during one CCA slot duration (S8033) to determine whether the channel is idle or busy (S8034). The terminal device decrements the counter value N by one (S8035) in a case of determining that the channel is idle, and returns to the idle state (S801) instead of performing the uplink transmission indicated by the uplink grant in a case of determining that the channel is busy. The terminal device then determines whether the counter value is 0 (S8036), and in a case that the counter value is 0, acquires the right to access the channel and proceeds to a transmission operation (S804, S805). On the other hand, in a case that the counter value is not 0, the terminal device senses the channel (medium) during one CCA slot duration again (S8033). Note that, in a case that the counter value N is generated, the value in the contention window q is updated to a value between X and Y according to the channel state (S8037). In a transmission process, the terminal device determines whether to actually perform an uplink transmission at that timing (S804), and in a case of determining to perform the uplink transmission, performs the uplink transmission (S805). In a case of determining not to perform the uplink transmission, the terminal device returns to the idle state (S801) instead of performing the uplink transmission indicated by the uplink grant.

The period of the first CCA may be preferably the same as the ECCA period in the downlink LBT.

Note that the ICCA may be performed before the first CCA as is the case with the downlink LBT. However, even in a case that the ICCA results in the determination that the channel is idle, the uplink is not transmitted and the procedure proceeds to the first CCA operation.

In the second uplink LBT, the CCA check is performed only once before the instructed timing for the uplink transmission. The terminal device attempts the CCA check once. In a case of determining that the channel is idle as a result of the CCA check, the terminal device can acquire the right to access the channel to transmit the uplink.

Figure 9:
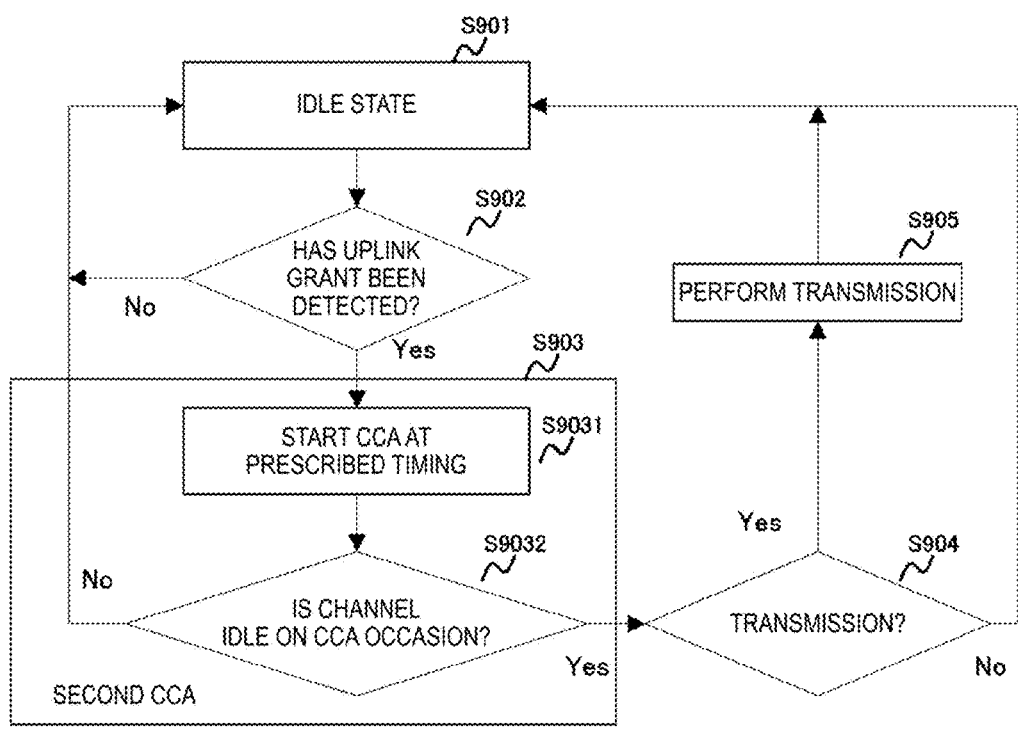
FIG. 9 is a diagram illustrating an example of a procedure of CCA for an uplink transmission according to the present embodiment.

FIG. 9 illustrates an example of a procedure of the second uplink LBT. In a case of detecting the uplink grant (S902) in the idle state (S901), the terminal device performs second CCA (S903). In the second CCA, the terminal device starts CCA at a prescribed timing (S9031). The terminal device performs the CCA check during a CCA period to sense whether the channel is idle or busy (S9032). In a case of determining that the channel is idle as a result of the second CCA (S903), the base station device acquires the right to access the channel and proceeds to a transmission operation. On the other hand, in a case of determining that the channel is busy as a result of the second CCA (S903), the terminal device returns to the idle state (S901) instead of performing the uplink transmission indicated by the uplink grant. After proceeding to the transmission operation, the terminal device determines whether to actually perform an uplink transmission at that timing (S904), and in a case of determining to perform the uplink transmission, the terminal device performs the uplink transmission (S905). In a case of determining not to perform the uplink transmission, the terminal device returns to the idle state (S901) instead of performing the uplink transmission indicated by the uplink grant.

The period of the second CCA may be preferably the same as the ICCA period in the downlink LBT.

Differences between the downlink LBT and the uplink LBT will be detailed below.

In the downlink LBT, the base station device performs the CCA check. On the other hand, in the uplink LBT, the terminal device performs the CCA check.

In the downlink LBT, LBT processing is started in a case that information (data, buffer, load, traffic) that needs to be transmitted has occurred. On the other hand, for the uplink LBT, LBT processing is started in a case that an uplink transmission is indicated by the base station device.

Note that the ICCA period of the downlink LBT may be preferably the same as the period of the second CCA. Note that the ECCA period of the downlink LBT may be preferably the same as the period of the first ICCA.

Next, specific examples are provided regarding switching between a case of transmitting the uplink following the first uplink LBT and a case of transmitting the uplink following the second uplink LBT or transmitting the uplink with no uplink LBT.

By way of example, the procedure of the uplink LBT is switched based on a prescribed field included in the uplink grant (DCI format 0 or 4) indicating an uplink transmission.

The prescribed field refers to, for example, 1-bit information specifying the uplink LBT for the terminal device. In other words, the prescribed field refers to 1-bit information indicating whether the channel has been successfully reserved (provided) in the subframe immediately before the subframe indicated by the uplink grant. In a case that a prescribed 1 bit is indicative of 0 (false, invalid, impossible), the terminal device performs the first uplink LBT before the uplink transmission. In a case that the prescribed 1 bit is indicative of 1 (true, valid, possible), the terminal device performs the second uplink LBT before the uplink transmission or performs no uplink LBT.

Alternatively, the prescribed field refers to, for example, information associated with the counter value N used in the first uplink LBT. In a case that the prescribed field is 0 (invalid, impossible), the terminal device performs the second uplink LBT before the uplink transmission or performs no uplink LBT. On the other hand, in a case that the prescribed field contains a numerical value other than 0 (invalid, impossible), the terminal device generates a counter value N, based on the numerical value to perform the first uplink LBT.

The information associated with the counter value N is, for example, the counter value N. The terminal device sets the value of the prescribed field at the counter value N instead of generating a counter value N by itself.

Moreover, the information associated with the counter value N is, for example, index information indicative of the configured counter value N. In a case that multiple candidates for the counter value N are configured for the terminal device by dedicated RRC and that the value in the prescribed field has been acquired, the configured counter value N corresponding to the information in the field is used.

Moreover, the information associated with the counter value N is, for example, information associated with the contention window q. Multiple candidates for the contention window q are configured for the terminal device by the dedicated RRC. In a case of acquiring the value in the prescribed field, the terminal device generates a counter value N by using the configured value of the contention window q corresponding to the information in the field. Note that the information associated with the contention window q may be the value of the contention window q.

Note that the above-described examples may include switching between a case of transmitting the uplink following the second uplink LBT and a case of transmitting the uplink with no uplink LBT. Specifically, in a case that the prescribed 1 bit is indicative of 0, the terminal device performs the second uplink LBT before the uplink transmission. On the other hand, in a case that the prescribed 1 bit is indicative of 1 (true, valid, possible), the terminal device performs no uplink LBT before the uplink transmission.

The information in the prescribed field may be information indicating whether to generate a gap where LBT is to be performed. For example, in a case that 1 bit in the prescribed field is 1, the terminal device transmits the PUSCH with a gap of prescribed SC-FDMA symbols before the transmission. In a case that the 1 bit in the prescribed field is 0, the terminal device transmits the PUSCH with no gap of prescribed SC-FDMA symbols before the transmission. The prescribed SC-FDMA symbols are, for example, several SC-FDMA symbols at the beginning or end of the subframe or a slot at the beginning or the end of the subframe.

Note that the prescribed field may be used along with any other field. For example, the procedure of the uplink LBT may be switched in accordance with an SRS request field. Specifically, the terminal device performs the second uplink LBT before the uplink transmission in a case that the SRS request field is indicative of 0, and performs no uplink LBT in a case that the SRS request field is indicative of 1. In a case that the SRS request field is indicative of 0, nothing is transmitted in the last one SC-FDMA symbol of the subframe. The terminal device performs the second uplink LBT in the last one SC-FDMA symbol.

By way of example, the procedure of the uplink LBT is switched based on a prescribed field included in DCI different from an uplink grant.

The DCI different from the uplink grant refers to, for example, DCI for notifying the terminal device whether the downlink transmission (transmission burst) has been performed in a subframe indicated in the DCI. Specifically, the subframe indicated in the DCI includes a subframe immediately before the uplink transmission, and a prescribed field in the DCI is information corresponding to a notification as to whether the downlink transmission is to be performed. In a case that the prescribed field in the DCI indicates that the downlink transmission is not to be performed, the terminal device performs the first uplink LBT before the uplink transmission. On the other hand, in a case that the prescribed field in the DCI indicates that the downlink transmission is to be performed, the terminal device performs the second uplink LBT before the uplink transmission or performs no uplink LBT.

The information notified in the DCI different from the uplink grant is, for example, the length of the downlink transmission. The information is indicative of the beginning and/or end of the downlink transmission. Predefinition or pre-configuration of the length of the downlink transmission allows the terminal device to recognize the length of the downlink transmission, based only on the information about the beginning or end of the downlink transmission. As an example, in a case that the length corresponds to one subframe and that the information in the DCI indicates that the downlink transmission starts at the beginning of a prescribed subframe, the terminal device recognizes that the downlink transmission is to be performed in the one indicated subframe.

Moreover, the DCI different from the uplink grant may be preferably mapped in the non-LAA cell. Specifically, the DCI is mapped in the common search space present in the primary cell or the primary secondary cell, and one piece of DCI allows notification of information corresponding to multiple serving cells.

Furthermore, the DCI different from the uplink grant is scrambled with dedicated RNTI different from C-RNTI (RNTI for downlink transmission notification only, B-RNTI). The RNTI for downlink transmission notification only may be preferably configured individually for multiple terminal devices but may be configured with a value common to the terminal devices.

Moreover, the DCI different from the uplink grant, for example, has the same format size as that of DCI format 1C used for very small-scale scheduling for one PDSCH codeword, notification of an MCCH change, or TDD reconfiguration. Alternatively, the DCI, for example, has the same format size as that of DCI format 3 or DCI format 3A used to transmit a TPC command for the PUCCH or the PUSCH.

Note that the DCI different from the uplink grant may correspond to a notification as to whether the uplink transmission (transmission burst) has been performed in a subframe indicated in the DCI.

Note that the above-described examples may include switching between a case of transmitting the uplink following the second uplink LBT and a case of transmitting the uplink with no uplink LBT. Specifically, in a case that the prescribed field in the DCI indicates that the downlink transmission is not to be performed, the terminal device performs the second uplink LBT before the uplink transmission. On the other hand, in a case that the prescribed field in the DCI indicates that the downlink transmission is to be performed, the terminal device performs no uplink LBT before the uplink transmission.

By way of example, the procedure of the uplink LBT is switched according to the type of uplink channel or signal scheduled to be transmitted.

For example, the terminal device performs the first uplink LBT before a transmission of the PUSCH. The terminal device performs the second uplink LBT before the PRACH or performs no uplink LBT.

For example, the terminal device performs the first uplink LBT before a transmission of the SRS with the PUSCH. The terminal device performs the second uplink LBT before the SRS without the PUSCH or performs no uplink LBT.

By way of example, the procedure of the uplink LBT is switched depending on whether a transmission of a downlink signal or channel from a cell to which the terminal device is connected has been detected before the terminal device transmits the uplink.

For example, a comparison between the received power of the CRS and a threshold is used as a reference for detection of a transmission of a downlink signal or channel from the cell to which the terminal device is connected. In a case that the terminal device determines that the received power of an RE on which the CRS of antenna port 0 (or antenna port 1, 2, 3) is mapped is smaller than a prescribed threshold in the subframe immediately before the subframe for the uplink transmission, the terminal device performs the first uplink LBT before the uplink transmission. On the other hand, in a case that the terminal device determines that the received power of the RE on which the CRS of antenna port 0 (or antenna port 1, 2, 3) is mapped exceeds the prescribed threshold in the subframe immediately before the subframe for the uplink transmission, the terminal device performs the second uplink LBT before the uplink transmission or performs no uplink LBT.

For example, whether the reservation signal has been successfully detected is used as the reference for detection of a transmission of the downlink signal or channel from the cell to which the terminal device is connected. In a case that the length of the downlink transmission is predefined or pre-configured and that the terminal device has successfully detected the reservation signal, whether the downlink transmission is to be performed in the subframe immediately before the subframe for the uplink transmission can be determined based on the time of the detection of the reservation signal (subframe, symbol, RE, Ts) and the length of the reservation signal. In a case of determining that the downlink transmission is not to be performed in the subframe immediately before the subframe for the uplink transmission, the terminal device performs the first uplink LBT before the uplink transmission. On the other hand, in a case of determining that the downlink transmission is to be performed in the subframe immediately before the subframe for the uplink transmission, the terminal device performs the second uplink LBT before the uplink transmission or performs no uplink LBT. A reference as to whether the terminal device has successfully detected the reservation signal is, for example, a comparison between the received power of the RE to which the reservation signal is assigned and a prescribed threshold.

For example, whether the PDCCH or the EPDCCH has successfully been detected is used as the reference for detection of a transmission of the downlink signal or channel from the cell to which the terminal device is connected. In a case that the PDCCH or the EPDCCH has successfully been decoded in the subframe immediately before the subframe for the uplink transmission, the terminal device can recognize that the subframe is reserved by the terminal device as a downlink subframe. In other words, in a case that the PDCCH or the EPDCCH has successfully been decoded in the subframe immediately before the subframe for the uplink transmission, the terminal device performs the first uplink LBT before the uplink transmission. On the other hand, in a case that the decoding of the PDCCH or the EPDCCH fails in the subframe immediately before the subframe for the uplink transmission, the terminal device performs the second uplink LBT before the uplink transmission or performs no uplink LBT.

For example, whether the PDSCH has successfully been detected is used as the reference for detection of a transmission of the downlink signal or channel from the cell to which the terminal device is connected. In a case that the PDSCH has successfully been decoded in the subframe immediately before the subframe for the uplink transmission, the terminal device can recognize that the subframe is reserved by the base station device as a downlink subframe. In other words, in a case that the PDSCH has successfully been decoded in the subframe immediately before the subframe for the uplink transmission, the terminal device performs the first uplink LBT before the uplink transmission. On the other hand, in a case that the decoding of the PDSCH fails in the subframe immediately before the subframe for the uplink transmission, the terminal device performs the second uplink LBT before the uplink transmission or performs no uplink LBT.

For example, whether the DMRS has successfully been detected is used as the reference for detection of a transmission of the downlink signal or channel from the cell to which the terminal device is connected. In a case that the DMRS has successfully been detected in the subframe immediately before the subframe for the uplink transmission, the terminal device can recognize that the subframe is reserved by the base station device as a downlink subframe. In other words, in a case that the DMRS has successfully been decoded in the subframe immediately before the subframe for the uplink transmission, the terminal device performs the first uplink LBT before the uplink transmission. On the other hand, in a case that the DMRS has successfully been detected in the subframe immediately before the subframe for the uplink transmission, the terminal device performs the second uplink LBT before the uplink transmission or performs no uplink LBT. The reference as to whether the terminal device has successfully detected the reservation signal is, for example, a comparison between the received power of an RE to which the DMRS is assigned and a prescribed threshold. In other words, the reference is a comparison between the received power of antenna port 7 or 9 and the prescribed threshold.

By way of example, the procedure of the uplink LBT is switched depending on whether the terminal device has transmitted any uplink signal or channel before transmitting the uplink.

For example, in a case that the terminal device has transmitted the PUSCH in the subframe immediately before the subframe for the uplink transmission, the transmission can be performed without LBT in this subframe because the channel has successfully been reserved for the subframe as an uplink subframe. In other words, in a case that the terminal device has not transmitted the PUSCH in the subframe immediately before the subframe for the uplink transmission, the terminal device performs the first uplink LBT or the second uplink LBT before the uplink transmission. On the other hand, in a case that the terminal device has transmitted the PUSCH in the subframe immediately before the subframe for the uplink transmission, the terminal device performs no uplink LBT.

For example, in a case that the terminal device has transmitted the SRS in the subframe immediately before the subframe for the uplink transmission, the transmission can be performed without LBT because the channel has successfully been reserved for the subframe as an uplink subframe. In other words, in a case that the terminal device has not transmitted the SRS in the subframe immediately before the subframe for the uplink transmission, the terminal device performs the first uplink LBT or the second uplink LBT before the uplink transmission. On the other hand, in a case of having transmitted the SRS in the subframe immediately before the subframe for the uplink transmission, the terminal device performs no uplink LBT.

For example, in a case that the terminal device has transmitted the PRACH in the subframe immediately before the subframe for the uplink transmission, the transmission can be performed in this subframe without LBT because the channel has been successfully reserved for the subframe as an uplink subframe. In other words, in a case that the terminal device has not transmitted the PRACH in the subframe immediately before the subframe for the uplink transmission, the terminal device performs the first uplink LBT or the second uplink LBT before the uplink transmission. On the other hand, in a case of having transmitted the PRACH in the subframe immediately before the subframe for the uplink transmission, the terminal device performs no uplink LBT.

By way of example, the procedure of the uplink LBT is switched according to the configuration provided by the higher layer.

The configuration provided by the higher layer refers to, for example, configuration information specifying the procedure of the uplink LBT. In a case that a configuration specifying the first uplink LBT is provided for the terminal device, the terminal device performs the first uplink LBT before an uplink transmission in the LAA cell for the terminal device. In a case that a configuration specifying the second uplink LBT is provided for the terminal device, the terminal device performs the second uplink LBT before an uplink transmission in the LAA cell for the terminal device. In a case that a configuration specifying that no uplink LBT is performed for the terminal device is provided, the terminal device performs no uplink LBT before performing the uplink transmission in the LAA cell.

The configuration provided by the higher layer refers to, for example, a configuration for cross carrier scheduling for the LAA cell. In a case that the cross carrier scheduling is configured for the LAA cell, the terminal device performs the first uplink LBT. In a case that self scheduling is configured for the LAA cell (in other words, in a case that the cross carrier scheduling is not configured for the LAA cell), the terminal device performs the second uplink LBT or performs no uplink LBT. In other words, in a case that the PDCCH or the EPDCCH in the uplink grant for scheduling of the uplink transmission for the LAA cell is configured to be monitored for a cell other than the LAA cell, the terminal device performs the first uplink LBT before the uplink transmission. On the other hand, in a case that the PDCCH or the EPDCCH in the uplink grant for scheduling of the uplink transmission for the LAA cell is not configured to be monitored for other than the LAA cell, the terminal device performs the second uplink LBT before the uplink transmission or performs no uplink LBT.

The cross carrier scheduling may be configured for each of the downlink grant and the uplink grant. In that case, the above-described examples of switching are regarded as switching as to whether the uplink grant is configured as the cross carrier scheduling.

The configuration provided by the higher layer refers to, for example, configuration of information indicative of a nation(s) where the LAA cell is operated. In a case that the information is indicative of a particular nation(s) (for example, Japan or the Europe), the terminal device performs the first uplink LBT before the uplink transmission for the LAA cell. On the other hand, in a case that the information is indicative of a country other than the particular nation(s) (for example, the U.S. or China), the terminal device performs the second uplink LBT before the uplink transmission for the LAA cell or performs no uplink LBT. The information indicative of the nation(s) where the LAA cell is operated is, for example, Public Land Mobile Network (PLMN). The PLMN is an identifier indicative of a country and an operator. The PLMN is included in the SIB1 and notified to the terminal device. Note that the procedure of the uplink LBT may be switched according to the operating band in addition to the information about the nation(s) where the LAA cell is operated. The information indicative of the operating band can be identified in information about the center frequency of the carrier (EARFCN value) configured by the higher layer.

The particular country is a country where LBT needs to be performed. The country information and the capability of the terminal device may be associated with each other. In other words, the terminal device may be linked with the particular nation(s) in such a manner that the capability required for the terminal device is specified.

The configuration provided by the higher layer refers to, for example, configuration of the first uplink LBT. The procedure of the uplink LBT is switched depending on whether the first uplink LBT has been configured for the terminal device. Specifically, in a case that the first uplink LBT has been configured by the higher layer, the terminal device performs the first uplink LBT before the uplink transmission for the LAA cell. On the other hand, in a case that the first uplink LBT has not been configured by the higher layer, the terminal device performs the second uplink LBT before the uplink transmission for the LAA cell or performs no uplink LBT. The configuration of the first uplink LBT includes, for example, information about the range X and Y for determination of the contention window q, a CCA slot length, a CCA threshold, and the like.

Note that the procedure of the uplink LBT may be switched depending on whether the second uplink LBT has been configured for the terminal device. Specifically, in a case that the second uplink LBT has been configured by the higher layer, the terminal device performs the first uplink LBT before the uplink transmission for the LAA cell. On the other hand, in a case that the second uplink LBT has been configured by the higher layer, the terminal device performs the second uplink LBT before the uplink transmission for the LAA cell. The configuration of the second uplink LBT includes, for example, the value of the contention window q, the CCA slot length, the CCA threshold, and the like.

The configuration of the first uplink LBT and the configuration of the second uplink LBT may be preferably specific to each cell. Note that one piece of configuration information may be configured commonly for all the cells configured as serving cells. This is not applicable to non-LAA cells configured as serving cells.

Note that the switching may be performed based on a combination of multiple configurations provided by the higher layer. In a specific example, in a case that the cross carrier scheduling is not configured for the LAA cell and that notification that the nation(s) where the LAA cell is operated is the particular nation(s) has been provided, the terminal device performs the second uplink LBT before the uplink transmission for the LAA cell or performs no uplink LBT. In a case that the cross carrier scheduling is configured for the LAA cell and that notification that the nation(s) where the LAA cell is operated is other than the particular nation(s) has been provided, the terminal device performs the first uplink LBT before the uplink transmission for the LAA cell.

Moreover, the switching may be performed in a case of combining multiple ones of the above-described examples. In a specific example, in a case that the self scheduling is configured for the LAA cell and that a prescribed field included in the uplink grant indicating the uplink transmission indicates that the first LBT is to be performed, the terminal device performs the first uplink LBT before the uplink transmission for the LAA cell. Otherwise the terminal device performs the second uplink LBT before the uplink transmission for the LAA cell or performs no uplink LBT.

Note that the parameter may be switched depending on the above-described examples. In a specific example, in a case that the terminal device performs the first uplink LBT but that the self scheduling is configured for the LAA cell, a value configured by the higher layer (RRC) is applied to the contention window q, and in a case that the cross carrier scheduling is configured for the LAA cell, the contention window q is updated at each transmission opportunity based on the value configured by the higher layer (RRC).

Note that the above-described examples may include switching between a case of transmitting the uplink following the second uplink LBT and a case of transmitting the uplink with no uplink LBT. In other words, in a case that the PDCCH or the EPDCCH in the uplink grant for scheduling of the uplink transmission for the LAA cell is configured to be monitored for a cell other than the LAA cell, the terminal device performs the second uplink LBT before the uplink transmission. On the other hand, in a case that the PDCCH or the EPDCCH in the uplink grant for scheduling of the uplink transmission for the LAA cell is not configured to be monitored for a cell other than the LAA cell, the terminal device performs no uplink LBT before the uplink transmission.

Figure 10:
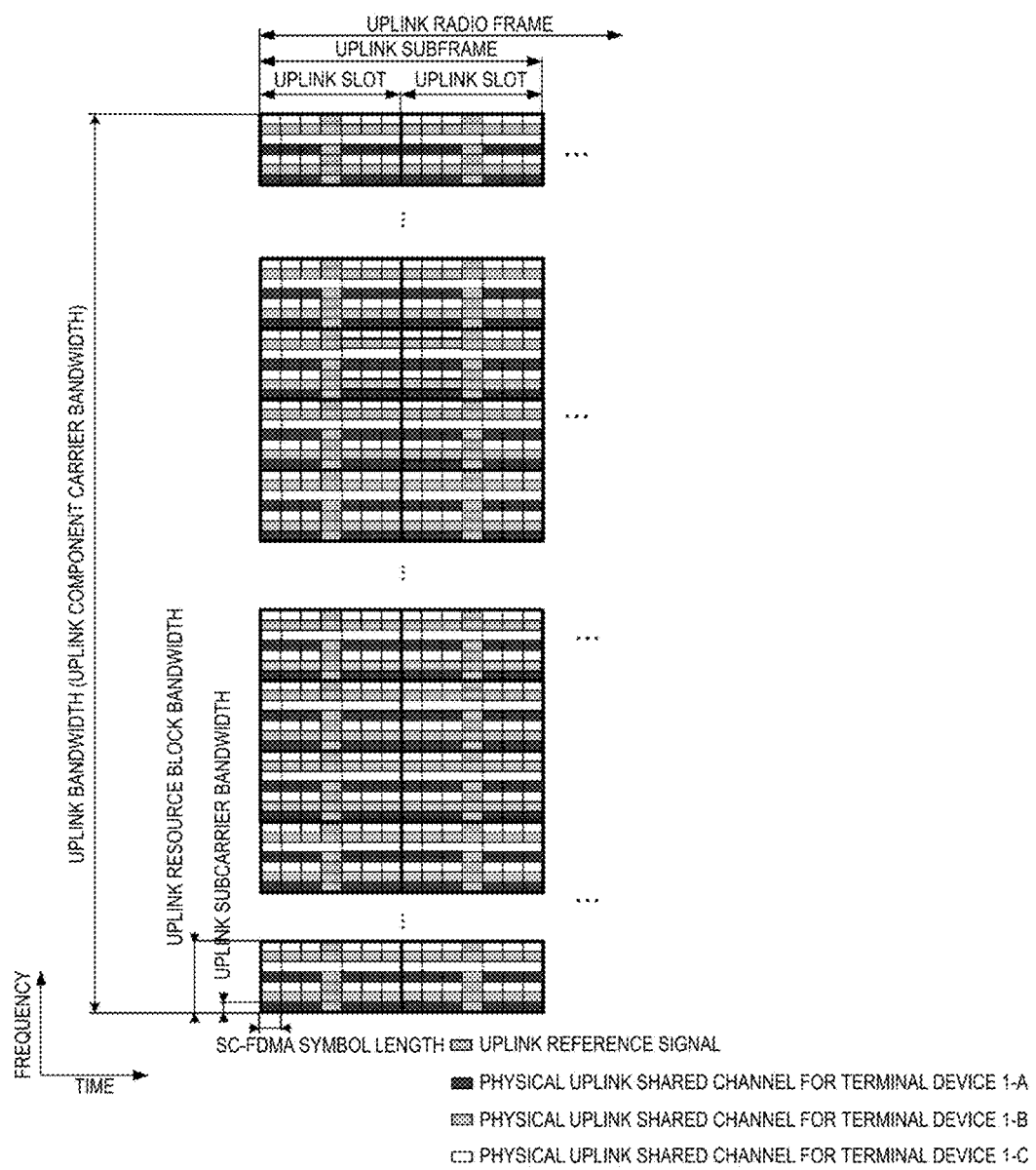
FIG. 10 is a diagram illustrating an example of frequency multiplexing of a physical uplink shared channel according to the present embodiment.

FIG. 10 illustrates an example of frequency multiplexing of the PUSCH in the LAA cell. In the LAA cell, PUSCH resources are not contiguously allocated but are allocated at intervals of several subcarriers in the frequency direction. The PUSCH is allocated among different terminal devices in an interlaced manner such that subcarriers are nested. In FIG. 10, the PUSCH is allocated at intervals of three subcarriers, and the PUSCH for three terminal devices is allocated in such a manner as to be interlaced for each subcarrier. This allows the terminal devices to utilize the entire bandwidth with a few resources.

To allow frequency multiplexing or spatial multiplexing among multiple terminal devices in the LAA cell by using the same subframes (time resources), transmission timings for the terminal devices need to be adjusted in such a manner that uplink channels and/or uplink signals from the respective terminal devices are simultaneously received by the base station device. Furthermore, in the LAA cell, the uplink LBT is performed before the uplink transmission. In a case that LBT is performed based on the counter value N, the number of attempts to perform CCA and the time needed for LBT vary according to the counter value N. The relationship between start timings for the uplink transmission and the uplink LBT will be described below.

Figure 11:
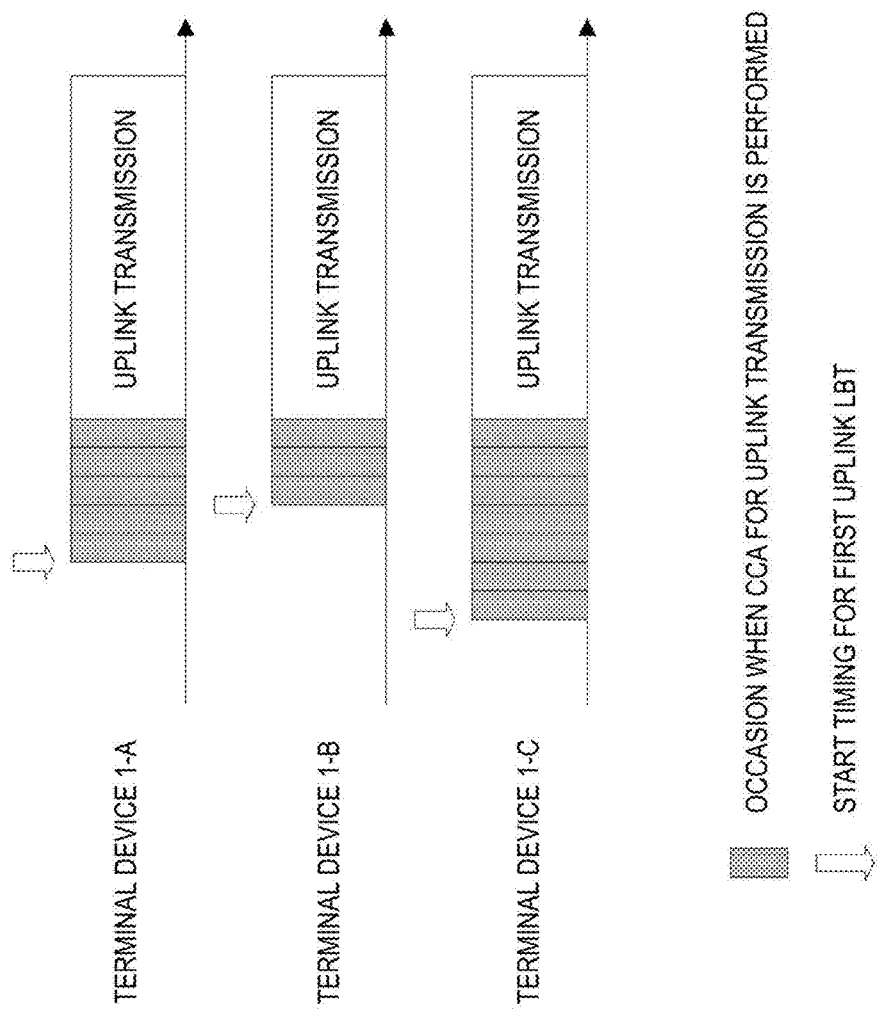
FIG. 11 is a diagram illustrating an example of CCA for an uplink transmission according to the present embodiment.

FIG. 11 illustrates an example of the relationship between the start timings for the uplink transmission and the uplink LBT. FIG. 11 is based on operations in accordance with the procedure of the uplink LBT in FIG. 8. The base station device notifies each terminal device of the timing (subframe) for the uplink transmission. The timing for the uplink transmission is implicitly notified, for example, based on a subframe in which the uplink grant is received. The terminal device independently generates a counter value N. The terminal device estimates the time when the uplink LBT is completed from the counter value N and the CCA period to determine the LBT start timing. That is, the terminal device can calculate the start timing for the uplink LBT, based on the start timing for the uplink transmission and the number of the first CCAs (counter value N). In other words, the CCA for the uplink transmission starts (counter value N×CCA period) microseconds before the beginning of the uplink subframe for the terminal device.

In a case of determining that the channel is busy as a result of the CCA, the terminal device does not perform the uplink transmission at the indicated timing for the uplink transmission. At this time, the counter value N is not discarded and is taken over by the next uplink LBT. In other words, in a case that any counter value N remains in the counter, no counter value N is generated. Note that the counter value N may be discarded and may not be taken over by the next uplink LBT depending on the type of the DCI format or a particular parameter. For example, in a case of receiving information indicative of the first transmission through a parameter indicative of new data (new data indicator), the terminal device discards the counter value N and does not take over the counter value N to the next uplink LBT. Moreover, the counter value N may be linked with the HARQ process. In other words, the counter value N for the uplink LBT for the PUSCH is independent among different HARQ processes.

Note that the uplink transmission may be performed in the middle of the uplink subframe. At that time, the CCA for the uplink transmission starts (counter value N CCA period) microseconds before the beginning of the uplink transmission that the terminal device is indicated to perform.

Note that the initial CCA may be performed in the uplink LBT. In that case, the CCA for the uplink transmission starts (initial CCA period+counter value N+CCA period) microseconds before the beginning of the uplink subframe in which the terminal device is indicated to perform the uplink transmission.

Note that, in a case that time is needed to switch from a receiver to a transmitter, the start timing for the uplink LBT is determined with the switching time taken into account. In other words, the CCA for the uplink transmission starts (counter value N×CCA period+time needed to switch from the receiver to the transmitter) microseconds before the beginning of the uplink subframe in which the terminal device is indicated to perform the uplink transmission.

Note that the start timing of CCA for the uplink transmission may be calculated based on the downlink radio frame (downlink subframe). In other words, the CCA for the uplink transmission starts (counter value N×CCA period+ uplink-downlink frame timing adjustment time) microseconds before the beginning of the downlink subframe corresponding to the uplink subframe in which the terminal device is indicated to perform the uplink transmission. Here, the uplink-downlink frame timing adjustment time is $(N_{TA}+N_{TA\_offset})\times T_s$, $N_{TA}$ is a terminal device-specific parameter having a value from 0 to 20512 to adjust the uplink transmission timing, and $N_{TA\_offset}$ is a frame configuration type-specific parameter for adjustment of the uplink transmission timing.

Here, in the LAA cell, a value that can be taken by $N_{TA}$ may be limited. In other words, in the LAA cell, the maximum value of $N_{TA}$ is smaller than 20512.

Figure 12:
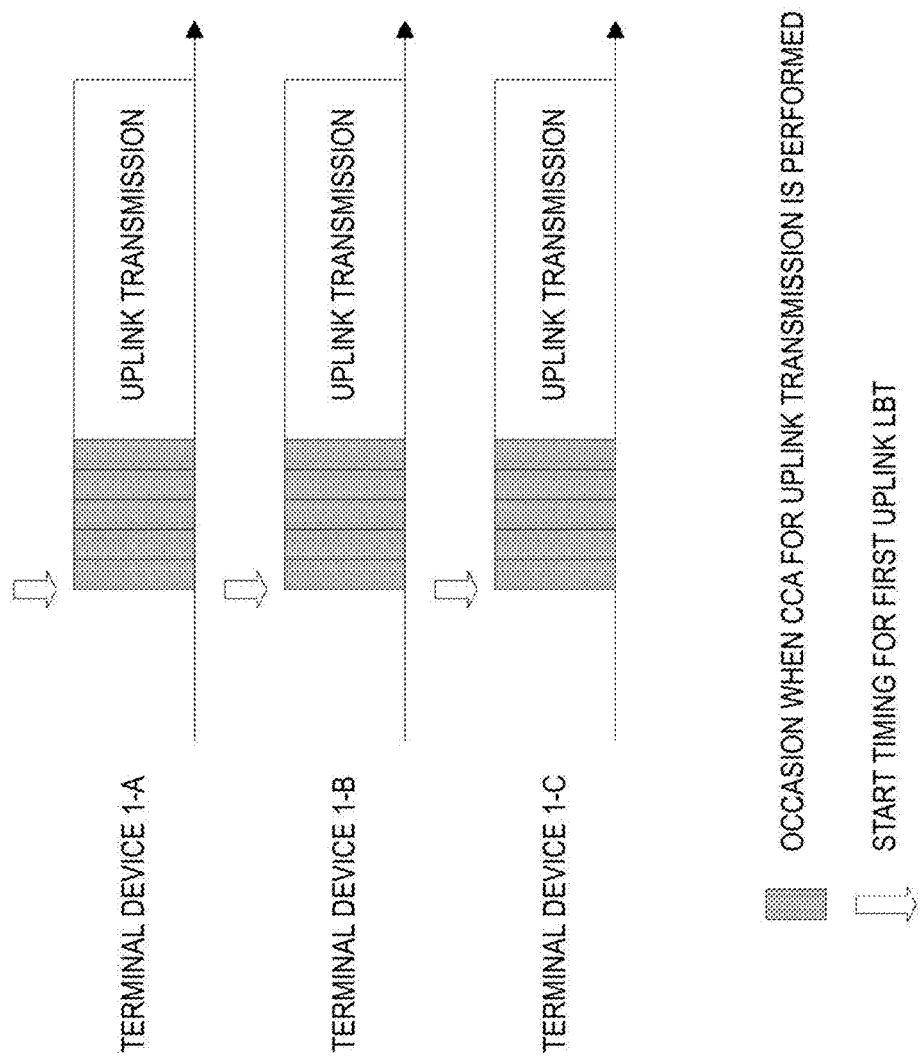
FIG. 12 is a diagram illustrating an example of CCA for an uplink transmission according to the present embodiment.

FIG. 12 illustrates an example of the relationship between the start timings for the uplink transmission and the uplink LBT. FIG. 12 is based on operations in accordance with the procedure of the uplink LBT in FIG. 8. The base station device notifies each terminal device of the start timing for the uplink LBT and information associated with the counter value N. The start timing for the uplink LBT is implicitly notified, for example, based on the subframe in which the uplink grant is received. The terminal device can recognize the start timing for the uplink transmission, based on the start timing for the uplink LBT and the counter value N. That is, the terminal device can calculate the start timing for the uplink transmission, based on the start timing for the uplink LBT and the number of the first CCAs (counter value N). In other words, the uplink transmission starts (counter value N×CCA period) microseconds after the beginning of an uplink subframe in which the terminal device is indicated to perform CCA. Here, the same counter value N is configured for all the terminal devices to be multiplexed.

The information associated with the counter value N is, for example, the counter value N. In a case of being notified of the counter value N, the terminal device performs the uplink LBT by using the counter value N.

Moreover, the information associated with the counter value N is, for example, a seed of random number used to generate the counter value N. The terminal device generates the counter value N by using the notified value and another parameter. Such another parameter is, for example, an accumulated value of the HARQ-ACK for the PUSCH, the cell ID, a subframe number, a system frame number, or the like.

The terminal device having determined that the channel is busy as a result of the CCA does not perform the uplink transmission at the indicated timing for the uplink transmission. At this time, the counter value N is discarded and is not taken over to the next uplink LBT.

Note that the initial CCA may be performed in the uplink LBT. In that case, the uplink transmission starts (initial CCA period+counter value N×CCA period) microseconds after the beginning of an uplink subframe in which the terminal device is indicated to perform CCA.

Note that, in a case that time is needed to switch from the receiver to the transmitter, the start timing for the uplink LBT is determined with the switching time taken into account. In other words, the uplink transmission starts (counter value N×CCA period+time needed to switch from the receiver to the transmitter) microseconds after the beginning of an uplink subframe in which the terminal device is indicated to perform CCA.

Note that the uplink transmission may be calculated based on the downlink radio frame (downlink subframe). In other words, the uplink transmission starts (counter value N×CCA period−uplink-downlink frame timing adjustment time) microseconds after the beginning of the downlink subframe corresponding to the uplink subframe in which the terminal device is indicated to perform the CCA. Here, the uplink-downlink frame timing adjustment time is $(N_{TA}+N_{TA\_offset}) \times T_s$, $N_{TA}$ is a terminal device-specific parameter having a value from 0 to 20512 to adjust the uplink transmission timing, and $N_{TA\_offset}$ is a frame configuration type-specific parameter for adjustment of the uplink transmission timing.

Figure 13:
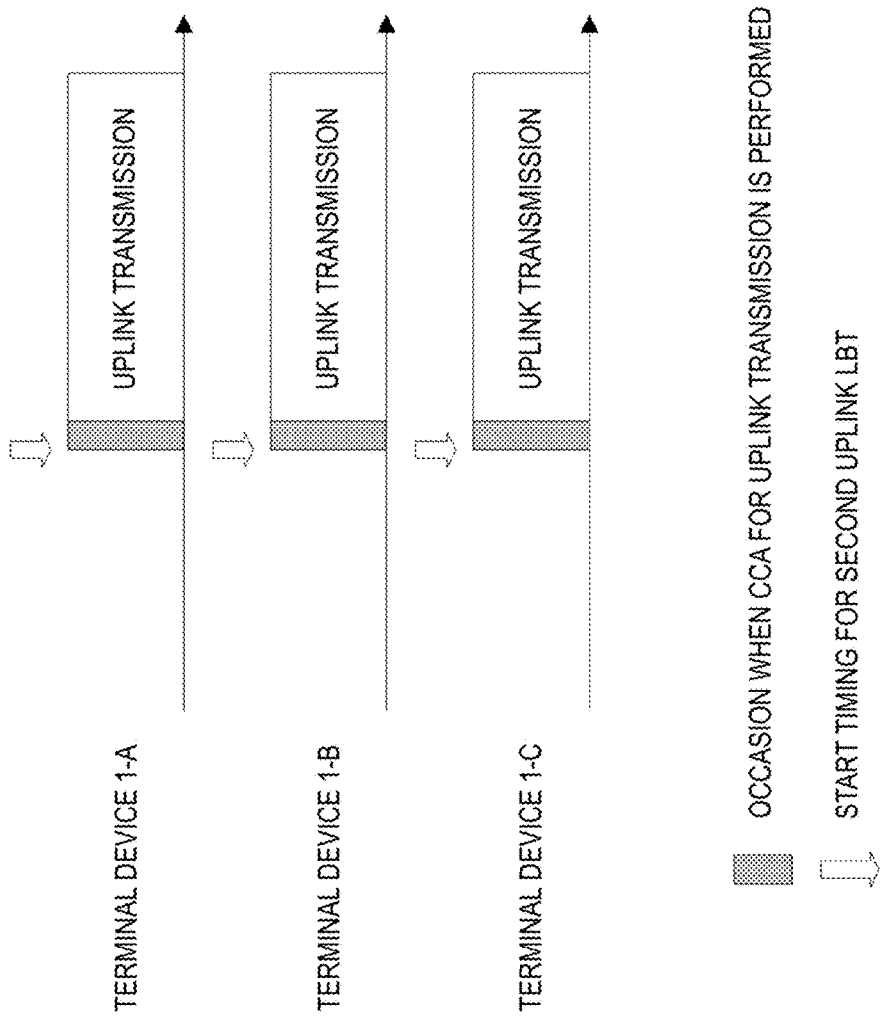
FIG. 13 is a diagram illustrating an example of CCA for an uplink transmission according to the present embodiment.

FIG. 13 illustrates an example of the relationship between the start timings for the uplink transmission and the uplink LBT. FIG. 13 is based on operations in accordance with the procedure of the uplink LBT in FIG. 9. The base station device notifies each terminal device of the timing (subframe) for the uplink transmission. The timing for the uplink transmission is implicitly notified, for example, based on a subframe in which the uplink grant is received. The terminal device determines the time when the uplink LBT is completed based on the CCA period to determine the LBT start timing. In other words, the CCA for the uplink transmission starts (CCA period) microseconds before the beginning of the uplink subframe in which the terminal device is indicated to perform the uplink transmission.

Note that, instead of the timing for the uplink transmission, the start timing for the uplink LBT may be notified. In that case, the terminal device can recognize the timing for the uplink transmission, based on the CCA period. In other words, the CCA for the uplink transmission starts (CCA period) microseconds before the beginning of the uplink subframe in which the terminal device is indicated to perform the uplink transmission.

The terminal device having determined that the channel is busy as a result of the CCA does not perform the uplink transmission at the indicated timing for the uplink transmission.

Figure 14:
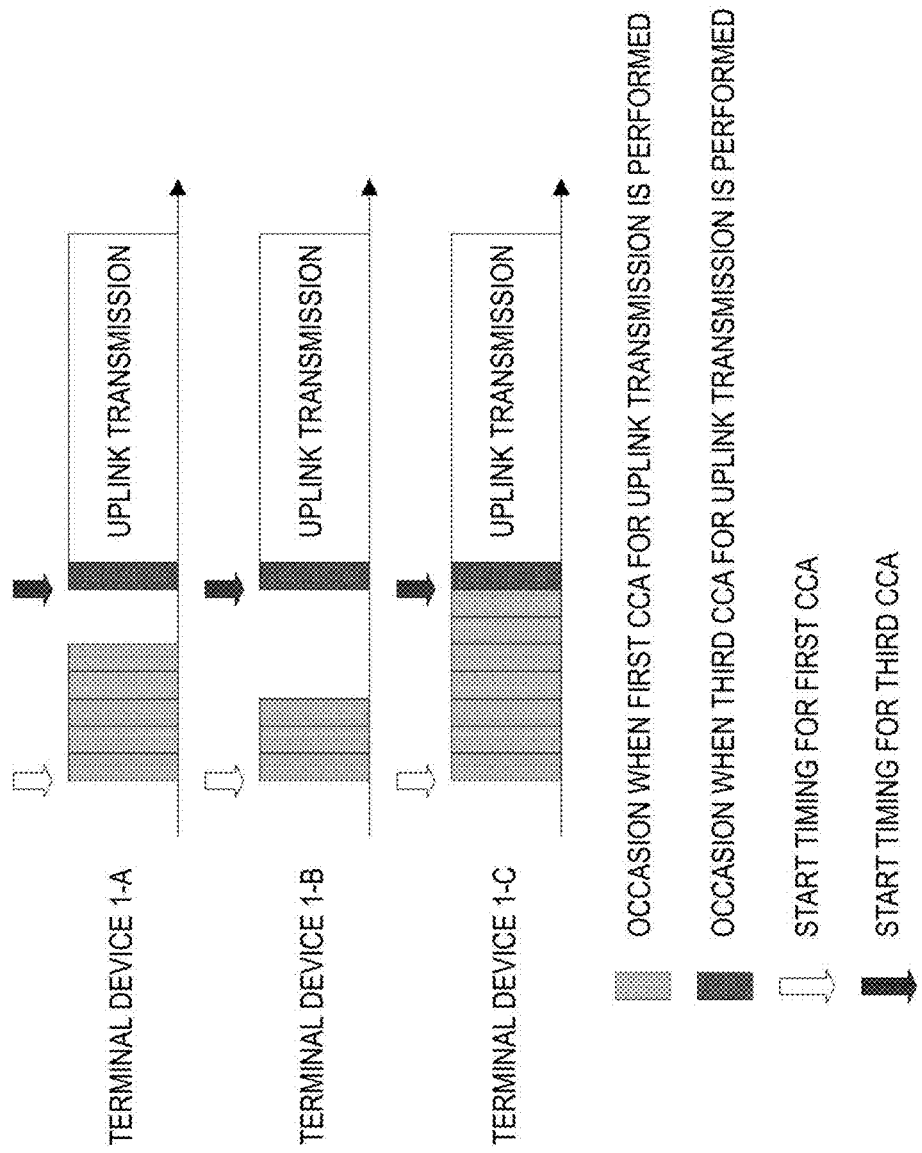
FIG. 14 is a diagram illustrating an example of CCA for an uplink transmission according to the present embodiment.

FIG. 14 illustrates an example of the relationship between the start timings for the uplink transmission and the uplink LBT. FIG. 14 is based on operations in accordance with the procedure of the uplink LBT in FIG. 15 described below. The base station device notifies each terminal device of the timing (subframe) for the uplink transmission. The timing for the uplink transmission is implicitly notified, for example, based on a subframe in which the uplink grant is received. The terminal device starts the first CCA at the start timing for the first CCA. In a case that the counter value N becomes 0, the terminal device waits until a start timing for third CCA. Then, the terminal device performs the third CCA at the start timing for the third CCA, and in a case that the channel is idle during the entire CCA period, performs the uplink transmission.

The start timing for the first CCA corresponds to, for example, the beginning of the subframe before the uplink transmission. In other words, the first CCA for the uplink transmission starts at the beginning of the subframe closest to the beginning of the uplink transmission in which the terminal device is indicated to perform.

Alternatively, the start timing for the first CCA is determined, for example, based on the contention window q for the terminal device. In other words, the first CCA for the uplink transmission starts (contention window q×CCA period) microseconds before the beginning of the uplink transmission in which the terminal device is indicated to perform.

The third CCA for the uplink transmission starts (third CCA period) microseconds before the beginning of the uplink subframe in which the terminal device is indicated to perform the uplink transmission.

The third CCA period for the uplink transmission may be preferably the same as the ICCA period.

Figure 15:
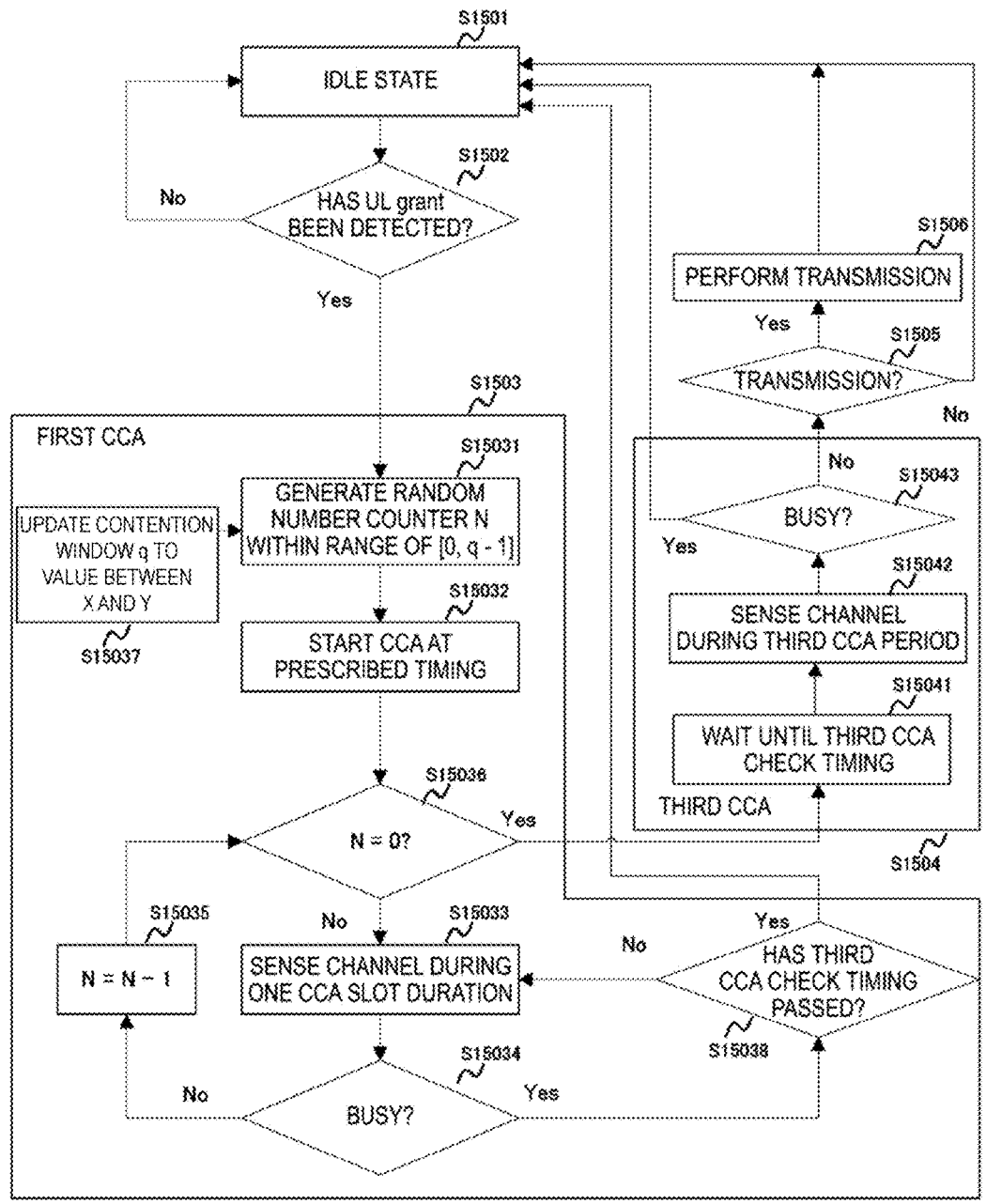
FIG. 15 is a diagram illustrating an example of a procedure of CCA for an uplink transmission according to the present embodiment.

FIG. 15 illustrates an example of the procedure of the uplink LBT. In a case of detecting the uplink grant (S1502) in the idle state (S1501), the terminal device performs the first CCA (S1503). In the first CCA, first, the terminal device randomly generates a counter value N within the range from 0 to q−1 (S15031). Note that, in a case that a numerical value associated with the counter value N is indicated by the base station device using the uplink grant, the terminal device uses the counter value N based on the numerical value instead of generating a counter value. Note that, in a case that the last LBT has not set the counter value to 0, with a value remaining in the counter, the terminal device may use the remaining counter value N instead of generating a counter value N. Then, the terminal device starts CCA at the prescribed timing (S15032). The terminal device senses the channel (medium) during one CCA slot duration (S15033) to determine whether the channel is idle or busy (S15034). The terminal device decrements the counter value N by one (S15035) in a case of determining that the channel is idle, and determines whether a third CCA check timing has passed (S15038) in a case of determining that the channel is busy. In a case that the third check timing has not passed, the terminal device returns to the process of sensing the channel (medium) during one CCA slot duration (S15033). In a case that the third CCA check timing has passed, the terminal device returns to the idle state (S1501) instead of performing the uplink transmission indicated by the uplink grant. After the counter value N is decremented by one, the terminal device determines whether the counter value is 0 (S15036), and in a case that the counter value is 0, proceeds to the operation of the third CCA (S1504). On the other hand, in a case that the counter value is not 0, the terminal device senses the channel (medium) during one CCA slot duration again (S15033). Note that the value in the contention window q obtained in a case that the counter value N is generated is updated to a value from X to Y according to the channel state (S15037). Then, in the third CCA (S1504), the terminal device waits until a timing when the third CCA starts (S15041), and senses the channel during the third CCA period (S15042). In a case of determining that the channel is busy as a result of the third CCA, the terminal device returns to the idle state (S1501) instead of performing the uplink transmission indicated by the uplink grant. On the other hand, in a case of determining that the channel is idle as a result of the third CCA, the terminal device acquires the right to access the channel and proceeds to a transmission operation (S1505, S1506). In a transmission process, the terminal device determines whether to actually perform the uplink transmission at that timing (S1505), and in a case of determining that the uplink transmission is to be performed, performs the uplink transmission (S1506). In a case of determining not to perform the uplink transmission, the terminal device returns to the idle state (S1501) instead of performing the uplink transmission indicated by the uplink grant.

Note that the ICCA may be performed as is the case with the downlink LBT. However, even in a case that the ICCA results in the determination that the channel is idle, the uplink is not transmitted and the procedure proceeds to an ECCA operation.

The above-described constitution allows one subframe to be multiplexed to be transmitted and/or received in multiple terminal devices, with long-term CCA checks performed by random number backoff.

Note that the LAA cell may be preferably operated in accordance with a half duplex scheme. The terminal device does not expect to receive, in a subframe in which an uplink transmission is being performed in one LAA cell, a downlink signal and/or channel from another LAA cell configured as a serving cell Specifically, the terminal device does not expect to receive, in a subframe for which the PUSCH is scheduled in one LAA cell by DCI format 0/4, the PDCCH or the EPDCCH in all LAA cells configured as serving cells. Furthermore, the terminal device performs, in the subframe, no uplink LBT in the LAA cell configured as a serving cell. Alternatively, the terminal device may determine the result of the uplink LBT of the LAA cell configured as a serving cell to be busy in the subframe. Moreover, the terminal device performs, in a subframe in which a downlink reception is being performed in one LAA cell, no uplink transmission in another LAA cell configured as a serving cell. In a specific example, the terminal device performs no uplink transmission in subframes configured as DMTC occasions. The terminal device does not expect that the PUSCH is scheduled for subframes configured as DMTC occasions. Moreover, in a serving cell operated as an LAA cell, the terminal device generates a guard period by avoiding reception of the end part of the downlink subframe immediately before the uplink subframe. Alternatively, in a serving cell operated as an LAA cell, the terminal device generates a guard period by avoiding reception of the downlink subframe immediately before the uplink subframe and reception of the downlink subframe immediately after the uplink subframe.

Note that the uplink LBT may be performed during the guard period.

Part of the content described in the present embodiment is rephrased as follows.

The terminal device includes a reception unit configured to receive a PDCCH, a transmission unit configured to transmit a PUSCH in a serving cell, and a CCA check unit configured to perform either first LBT for performing a CCA check the number of times based on a random number before a subframe for which a transmission of the PUSCH is indicated or second LBT for performing a CCA check only once. The terminal device switches between the first LBT and the second LBT, based on a prescribed condition.

Moreover, the information about the PDCCH is constituted by 1 bit. The first LBT is performed before the subframe for which the transmission of the PUSCH is indicated in a case that the information about the PDCCH is 1, and the second LBT is performed before the subframe for which the transmission of the PUSCH is indicated in a case that the information about the PDCCH is 0.

Moreover, the first LBT is performed before the subframe for which the transmission of the PUSCH is indicated in a case that a downlink transmission burst is not detected in a subframe immediately before a subframe in which the PUSCH is transmitted, and the second LBT is performed before the subframe for which the transmission of the PUSCH is indicated in a case that the downlink transmission burst is detected in the subframe immediately before the subframe in which the PUSCH is transmitted.

Moreover, the first LBT is performed before the subframe for which the transmission of the PUSCH is indicated in a case that the PDCCH is configured to be monitored in another serving cell different from the serving cell, and the second LBT is performed before the subframe for which the transmission of the PUSCH is indicated in a case that the PDCCH is not configured to be monitored in another serving cell different from the serving cell.

Moreover, the first LBT is performed before the subframe for which the transmission of the PUSCH is indicated in a case that the PUSCH is not transmitted in the subframe immediately before the subframe in which the PUSCH is transmitted, and no LBT is performed before the subframe for which the transmission of the PUSCH is indicated in a case that the PUSCH is transmitted in the subframe immediately before the subframe in which the PUSCH is transmitted.

Furthermore, part of the content described in the present embodiment is rephrased as follows.

The terminal device includes a transmission unit configured to transmit a PUSCH and a CCA check unit configured to perform LBT before a subframe for which a transmission of the PUSCH is indicated. The terminal device determines an LBT start time, based on a PUSCH transmission start time and a CCA slot length.

Moreover, in the LBT, a CCA check is performed the prescribed number of times, and the LBT start time is determined based on the PUSCH transmission start time and the CCA slot length.

Moreover, the terminal device includes a reception unit configured to receive a PDCCH. The number of the CCA checks is indicated by the PDCCH.

Note that the uplink LBT according to the present embodiment may similarly be applied to sidelink LBT for a sidelink transmission. The sidelink transmission is used for device to device communication (D2D) between the terminal devices.

Note that, in a case that one or more configurations (LAA-Config) which are necessary for LAA communication for prescribed serving cell are configured to the terminal device 1, the prescribed serving cell may be regarded as the LAA cell. The configurations which are necessary for the LAA communication are, for example, a parameter associated with a reservation signal, a parameter associated with RSSI measurement and a parameter associated with the second DS configuration.

In this regard, in a case that information (EARFCN value) on a center frequency associated with an LAA band for prescribed serving cell is configured to the terminal device 1, the cell of the frequency may be regarded as the LAA cell. The LAA bands (LAA operating band) refer to, for example, bands meeting one or more features of bands whose band numbers are 252 to 255, bands which are neither a TDD band nor an FDD band, bands which are defined by a 5 GHz band, and bands which are defined only by a 20 MHz bandwidth.

Note that the prescribed frequency may be preferably a frequency used by the LAA cell. The prescribed frequency may be preferably a frequency of cells which transmit the DSs based on LBT. The prescribed frequency may be preferably a frequency of cells operated in an unlicensed band. The prescribed frequency may be preferably a frequency of an operating band associated with a prescribed index of the operating band. The prescribed frequency may be preferably a frequency of an operating band associated with an index of the operating band for LAA. The prescribed frequency may be preferably an operating band associated with a prescribed index of the operating band (E-UTRA operating band). For example, the operating bands may be preferably managed by a table. An associated index is given to each operating band managed by the table. The index is linked to an associated uplink operating band, downlink operating band and a duplex mode. Note that the uplink operating band is an operating band used for reception at the base station device and transmission at the terminal device. The downlink operating band is an operating band used for transmission at the base station device and reception at the terminal device. Each of the uplink operating band and the downlink operating band may be preferably given by a lower limit frequency and an upper limit frequency (associated frequency band). The duplex mode may be preferably given by TDD or FDD. The duplex mode in the LAA cell may be other than TDD and FDD. For example, the duplex mode in the LAA cell may be a transmission burst to be described below (optionally including at least a downlink burst or an uplink burst).

In a case that, for example, the operating bands are managed by the table, operating bands associated with an index "1" to an index "44" may be preferably licensed bands (bands which are not LAA), and operating bands associated with an index "252" to an index "255" may be preferably unlicensed bands (LAA bands). Note that the uplink operating band may not be preferably applied to the index "252" (n/a, not applicable). The 5150 MHz to 5250 MHz may be preferably applied to the downlink operating band. FDD may be preferably applied to the duplex mode. Furthermore, for the index "253", the uplink operating band may be preferably reserved (reserved to be used in future), and the downlink operating band may be preferably reserved. FDD may be preferably applied to the duplex mode. Furthermore, for the index "254", the uplink operating band may be preferably reserved (reserved to be used in future), and the downlink operating band may be preferably reserved. FDD may be preferably applied to the duplex mode. Note that the uplink operating band may not be preferably applied to the index "255" (n/a, not applicable). The 5725 MHz to 5850 MHz may be preferably applied to the downlink operating band. FDD may be preferably applied to the duplex mode. Note that 5150 MHz to 5250 MHz and 5725 MHz to 5850 MHz may be preferably unlicensed bands (LAA bands). In other words, the prescribed frequencies described above may be preferably operating bands associated with the index "252" to the index "255".

Moreover, although the description has been given in each of the above-described embodiments by using the terms "primary cell" and "PS cell", these terms may not be necessarily used. For example, "primary cell" in each of the above-described embodiments may be referred to as "master cell", and "PS cell" in each of the above-described embodiments may be referred to as "primary cell".

A program running on each of the base station device 2 and the terminal device 1 according to the present invention may be a program (a program for causing a computer to operate) that controls a Central Processing Unit (CPU) and the like in such a manner as to realize the functions according to the above-described embodiments of the present invention. The information handled in these devices is temporarily stored in a Random Access Memory (RAM) while being processed. Then, the information is stored in various types of Read Only Memory (ROM) such as a Flash ROM and a Hard Disk Drive (HDD) and is read out by the CPU to be modified or rewritten, when necessary.

Moreover, the terminal device 1 and the base station device 2-1 or the base station device 2-2 according to the above-described embodiments may be partially realized by the computer. This configuration may be achieved by recording a program for enabling such control functionalities on a computer-readable recording medium and causing a computer system to read the program recorded on the recording medium for execution.

Moreover, the "computer system" here is defined as a computer system built into the terminal device 1 or the base station device 2-1 or the base station device 2-2, and the computer system includes an OS and hardware components such as peripheral devices. Furthermore, "computer-readable recording medium" refers to a portable medium, such as a flexible disk, a magneto-optical disk, a ROM, and a CD-ROM, and a storage device, for example, a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system that functions as a server or a client. Furthermore, the program may be configured to enable some of the functionalities described above, and also may be configured to enable the functionalities described above in combination with a program already recorded in the computer system.

Furthermore, the base station device 2-1 or base station device 2-2 according to the above-described embodiments can be realized as an aggregation (a device group) constituted of a plurality of devices. Devices constituting the device group may be each equipped with some or all portions of each function or each functional block of the base station device 2-1 or base station device 2-2 according to the above-described embodiments. It is only required that the device group itself include general functions or general functional blocks of the base station device 2-1 or base station device 2-2. Furthermore, the terminal device 1 according to the above-described embodiment is capable of communicating with the base station device as the aggregation.

Furthermore, the base station device 2-1 or base station device 2-2 according to the above-described embodiments may be an Evolved Universal Terrestrial Radio Access Network (E-UTRAN). Furthermore, the base station device 2-1 or base station device 2-2 according to the above-described embodiments may have some or all portions of a function of a higher node for an eNodeB.

Furthermore, some or all portions of each of the terminal device 1 and the base station device 2-1 or base station device 2-2 according to the above-described embodiments may be typically achieved as a Large-Scale Integration (LSI) that is an integrated circuit or may be realized as a chip set. The functional blocks of each of the terminal device 1 and the base station device 2-1 or base station device 2-2 may be individually realized as a chip, or some or all of the functional blocks may be integrated into a chip. Furthermore, the circuit integration technique is not limited to the LSI, and the integrated circuit may be achieved with a dedicated circuit or a general-purpose processor. Furthermore, according to advances in semiconductor technologies, a circuit integration technology that can replace LSI appears, it is also possible to use an integrated circuit based on the technology.

Furthermore, according to the above-described embodiments, the cellular mobile station device is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an Audio-Video (AV) apparatus, a kitchen apparatus, a cleaning or washing machine, an air-conditioning apparatus, office equipment, a vending machine, and other household apparatuses.

Heretofore, the embodiments of the present invention have been described in detail with reference to the drawings, but the specific configuration is not limited to the embodiments, and includes, for example, design variations that fall within the scope that does not depart from the gist of the present invention. Furthermore, various modifications are possible within the scope defined by claims, and embodiments that are made by suitably combining technical measures disclosed in the different embodiments are also included in the technical scope of the present invention. Furthermore, another configuration is also included such that constituent elements, each of which has been described in the above embodiments and achieve the same advantage, can be replaceable with each other.

Supplement (1) A terminal device according to an aspect of the present invention includes: a transmission unit configured to transmit a PUSCH; and a CCA check unit configured to perform LBT before a subframe for which a transmission of the PUSCH is indicated. The terminal device determines start time of the LBT, based on start time of the transmission of the PUSCH and a CCA slot length.

(2) Moreover, a terminal device according to an aspect of the present invention is based on the above-described terminal device, in which, in the LBT, a CCA check is performed a prescribed number of times, and the start time of the LBT is determined based on the start time of the transmission of the PUSCH, the CCA slot length, and the number of CCA checks.

(3) Moreover, a terminal device according to an aspect of the present invention is based on the above-described terminal device, the terminal device including a reception unit configured to receive a PDCCH. The number of CCA checks is indicated on the PDCCH.

(4) Moreover, a base station device according to an aspect of the present invention is a base station device for communicating with a terminal device, is a base station device for communicating with a terminal device, the base station device including: a reception unit configured to receive a PUSCH; and a transmission unit configured to transmit a PDCCH. In LBT of the terminal device, a CCA check is performed a prescribed number of times. Start time of the LBT is determined based on start time of a transmission of the PUSCH, a CCA slot length, and the number of CCA checks. The base station device indicates the number of CCA checks on the PDCCH.

(5) Moreover, a communication method according to an aspect of the present invention is a communication method used by a terminal device, the communication method including the steps of: transmitting a PUSCH; and performing LBT before a subframe for which a transmission of the PUSCH is indicated. In the communication method, start time of the LBT is determined based on start time of the transmission of the PUSCH and a CCA slot length.

(6) Moreover, a communication method according to an aspect of the present invention is a communication method used by a base station device for communicating with a terminal device, the communication method including the steps of: receiving a PUSCH; and transmitting a PDCCH. In LBT of the terminal device, a CCA check is performed a prescribed number of times. Start time of the LBT is determined based on start time of a transmission of the PUSCH, a CCA slot length, and the number of CCA checks. In the communication method, the number of CCA checks is indicated on the PDCCH.

CROSS-REFERENCE TO RELATED APPLICATION

The present application claims benefit of priority to JP 2015-154657 filed on Aug. 5, 2015, the entire content of which is incorporated herein by reference.

DESCRIPTION OF REFERENCE NUMERALS

301 Higher layer
302 Control unit
303 Codeword generation unit
304 Downlink subframe generation unit
305 Downlink reference signal generation unit
306 OFDM signal transmission unit
307 Transmit antenna
308 Receive antenna
309 SC-FDMA signal reception unit
310 Uplink subframe processing unit
311 Uplink control information extraction unit
401 Receive antenna
402 OFDM signal reception unit
403 Downlink subframe processing unit
404 Downlink reference signal extraction unit
405 Transport block extraction unit
406 Control unit
407 Higher layer
408 Channel state measurement unit
409 Uplink subframe generation unit
410 Uplink control information generation unit
411 SC-FDMA signal transmission unit
412 Transmit antenna

The invention claimed is:

1. A terminal device comprising:
reception circuitry configured to receive a physical downlink control channel including a first downlink control information (DCI) format;
transmission circuitry configured to transmit a physical uplink shared channel (PUSCH) for a licensed assisted access (LAA) cell scheduled by the first DCI format; and
clear channel assessment (CCA) check circuitry configured to perform a Listen-Before-Talk (LBT) procedure, the LBT procedure being a procedure that senses a channel to determine whether the channel is idle or busy before transmission of the PUSCH;
wherein
the first DCI format includes 1-bit information indicating one of a first type of the LBT procedure and a second type of the LBT procedure,
the first type of the LBT procedure being repetitions of carrier sense during a slot duration,
a number of the repetitions determined by a random number,
the second type of the LBT procedure being a single carrier sense during a carrier sense period,
in a case of performing a channel state information reporting using the PUSCH on the LAA cell, the CCA check circuitry is configured to perform the one of the first type and the second type of the LBT procedure indicated by the 1-bit information, and the transmission circuitry is configured to transmit the PUSCH at a transmission timing indicated by the first DCI format after the channel determined to be idle.

2. The terminal device according to claim 1, wherein, in a second case that a value at a field in the first DCI format is a first value, the transmission circuitry is configured to transmit the PUSCH without a transmission gap for a data symbol, and in a third case that the value is a second value, the transmission circuitry is configured to transmit the PUSCH with the transmission gap.

3. The terminal device according to claim 1, wherein, in a second case that a second DCI format is received, the CCA check circuitry is configured to perform the LBT within a downlink transmission duration indicated by the second DCI format.

4. A method for a terminal device, the method comprising:

receiving a physical downlink control channel including a first downlink control information (DCI) format;

transmitting a physical uplink shared channel (PUSCH) for a licensed assisted access (LAA) cell scheduled by the first DCI format; and performing a Listen-Before-Talk (LBT) procedure, the LBT procedure being a procedure that senses a channel to determine whether the channel is idle or busy before transmission of the PUSCH;

wherein the first DCI format includes 1-bit information indicating one of a first type of the LBT procedure and a second type of the LBT procedure, the first type of the LBT procedure being repetitions of carrier sense during a slot duration, a number of the repetitions determined by a random number, the second type of the LBT procedure being a single carrier sense during a carrier sense period, in a case of performing a channel state information reporting using the PUSCH on the LAA cell, performing the one of the first type and the second type of the LBT procedure indicated by the 1-bit information, and transmitting the PUSCH at a transmission timing indicated by the first DCI format after the channel determined to be idle.

5. The method according to claim 4, wherein, in a second case that a value at a field in the first DCI format is a first value, transmitting the PUSCH without a transmission gap for a data symbol, and in a third case that the value is a second value, transmitting the PUSCH with the transmission gap.

6. The method according to claim 4, wherein, in a second case that a second DCI format is received, performing the LBT within a downlink transmission duration indicated by the second DCI format.

* * * * *